(12) United States Patent
Maruyama et al.

(10) Patent No.: US 8,843,602 B2
(45) Date of Patent: Sep. 23, 2014

(54) NETWORK BOOT SYSTEM

(75) Inventors: Shin Maruyama, Kyoto (JP); Masahiro Kozuka, Ishikawa (JP)

(73) Assignee: CO-CONV, Corp. (JP)

( * ) Notice: Subject to any disclaimer, the term of this patent is extended or adjusted under 35 U.S.C. 154(b) by 890 days.

(21) Appl. No.: 12/994,518

(22) PCT Filed: May 28, 2009

(86) PCT No.: PCT/JP2009/059808
§ 371 (c)(1),
(2), (4) Date: Nov. 24, 2010

(87) PCT Pub. No.: WO2009/145274
PCT Pub. Date: Dec. 3, 2009

(65) Prior Publication Data
US 2011/0083006 A1    Apr. 7, 2011

(30) Foreign Application Priority Data
May 29, 2008   (JP) ................. 2008-140739

(51) Int. Cl.
*G06F 15/177* (2006.01)
*G06F 9/44* (2006.01)

(52) U.S. Cl.
CPC .................................. *G06F 9/4416* (2013.01)
USPC ....................................... 709/222; 709/220

(58) Field of Classification Search
CPC ................................................. G06F 9/4416
USPC ................................................ 709/220, 222
See application file for complete search history.

(56) References Cited

U.S. PATENT DOCUMENTS

| 5,452,454 A * | 9/1995 | Basu .................................. 713/2 |
| 5,522,037 A | 5/1996 | Kitagawa et al. |
| 5,802,297 A | 9/1998 | Engquist |
| 7,849,274 B2 * | 12/2010 | Pittman ......................... 711/154 |

(Continued)

FOREIGN PATENT DOCUMENTS

| EP | 752660 A1 | 1/1997 |
| JP | 2007-084728 A | 3/1995 |

(Continued)

OTHER PUBLICATIONS

International Search Authority (ISA/JPO); International Search Report mailed Jul. 7, 2009 for International Application PCT/JP2009/059808; 2 pages.

(Continued)

*Primary Examiner* — Mohamed Wasel
(74) *Attorney, Agent, or Firm* — Beem Patent Law Firm

(57) ABSTRACT

In a network boot system, a client terminal is caused to detect a revision of a virtual disk so as to decide operations of a read cache driver. The client terminal has a physical storage device. An operating system operating on the client terminal has a read cache mechanism that read-caches data that has been read out from a boot server. The read cache mechanism includes a filter driver for converting an access to a local bus of the client terminal into an access to the network, and a read cache driver for driving a storage device. The data in the virtual disk is compared with the revision of the read cache data. The operations of the read cache driver are decided based on the comparison result.

10 Claims, 15 Drawing Sheets

(56) References Cited

U.S. PATENT DOCUMENTS

| | | | |
|---|---|---|---|
| 8,332,370 B2* | 12/2012 | Gattegno et al. | 707/695 |
| 2003/0037202 A1* | 2/2003 | Kedem et al. | 711/100 |
| 2005/0182909 A1* | 8/2005 | Volp et al. | 711/152 |
| 2005/0246453 A1* | 11/2005 | Erlingsson et al. | 710/1 |
| 2005/0246518 A1 | 11/2005 | Takahashi | |
| 2007/0266027 A1* | 11/2007 | Gattegno et al. | 707/8 |
| 2012/0265976 A1* | 10/2012 | Spiers et al. | 713/2 |
| 2013/0227564 A1* | 8/2013 | Asayama | 718/1 |

FOREIGN PATENT DOCUMENTS

| | | |
|---|---|---|
| JP | 2009-034825 A | 2/1997 |
| JP | 2000-076152 A | 3/2000 |
| JP | 2001-325140 A | 11/2001 |
| JP | 2005-316809 A | 11/2005 |
| JP | 2006-252124 A | 9/2006 |
| JP | 2007-199992 A | 8/2007 |
| JP | 2007-323354 A | 12/2007 |

OTHER PUBLICATIONS

Dinah McNutt et al., "Daemons & Dragons (86) AutoClient no Donyu", Unix Magazine, Apr. 1, 1997, pp. 59-61, vol. 12, No. 4.

Jun'ichi Oka et al., "PC Tanmatsu no Ichigen Kanri o Sasaeru STRAGEX no Storage Kanri Gijutsu", NTT Gijustsu Journal, Jan. 1, 2008, vol. 20, No. 1, pp. 52-54.

* cited by examiner (a)

(b)

FIG. 3 (a)
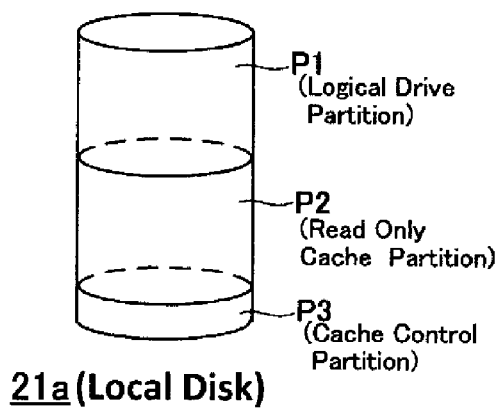
21a (Local Disk)
FIG. 3 (b)
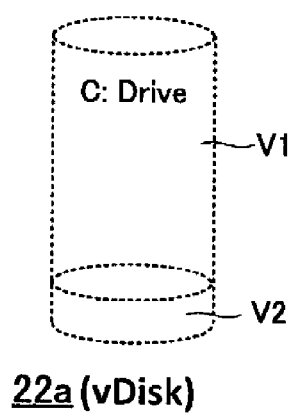
22a (vDisk)
FIG. 3 (c)
P1
| swap | vDisk Cache (Read/Write cache) | work area |
※ P2 AND P3 ARE INVISIBLE FROM OS share mode private mode

| Rule 1 | CHECK VALUE OF DIRTY FLAG OF VIRTUAL DISK WHEN BOOTING CLIENT (Sa1) |
|---|---|
| Rule 1-1 | WHEN DIRTY FLAG IS 0, START READ CACHE (Sa1-1) |
| Rule 1-2 | WHEN DIRTY FLAG IS 1, STOP READ CACHE (Sa1-2) |
| Rule 2 | WHEN BOOTING CLIENT TERMINAL, WRITE "1" IN FLAG STORAGE AREA (Sa2) |
| Rule 3 | WHEN REVISION HAS BEEN SAFELY UPDATED, WRITE "0" IN DIRTY FLAG (Sa4) |

CHANGED AREA MAP 60 FROM
REVISION 12 → REVISION 13

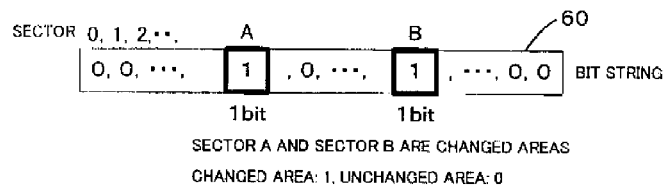

SECTOR A AND SECTOR B ARE CHANGED AREAS

CHANGED AREA: 1, UNCHANGED AREA: 0

FIG. 8(b)

CACHE MANAGEMENT
TABLE 70a OF REVISION 12

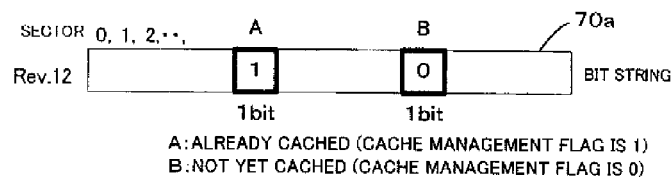

A: ALREADY CACHED (CACHE MANAGEMENT FLAG IS 1)
B: NOT YET CACHED (CACHE MANAGEMENT FLAG IS 0)

FIG. 8(c)

CACHE MANAGEMENT TABLE
70b OF REVISION 13

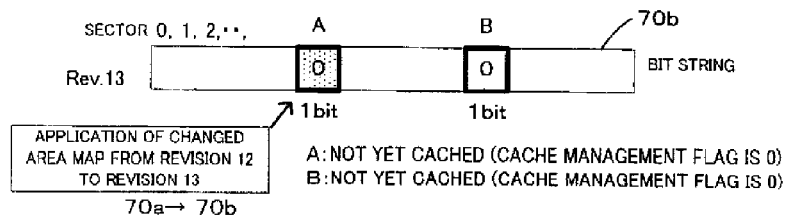

APPLICATION OF CHANGED
AREA MAP FROM REVISION 12
TO REVISION 13
70a → 70b

A: NOT YET CACHED (CACHE MANAGEMENT FLAG IS 0)
B: NOT YET CACHED (CACHE MANAGEMENT FLAG IS 0)

FIG. 13(a)

CACHE MANAGEMENT TABLE

| TYPE OF STATE FLAG | VALUE OF STATE FLAG | |
|---|---|---|
| READ MANAGEMENT FLAG | 0 (NOT READ YET) | 1 (ALREADY READ) |
| WRITE MANAGEMENT FLAG | 0 (NOT WRITTEN YET) | 1 (ALREADY WRITTEN) |

FIG. 13(b)

PROCESSING OF READ REQUEST SIGNAL

| | STATE | OPERATION |
|---|---|---|
| (I) | (R, W) =(0, 0) | CACHE DATA UNAVAILABLE (NO DATA) |
| (II) | (R, W) =(1, 0) | CACHE DATA AVAILABLE |
| (III) | (R, W) =(1, 1) | CACHE DATA UNAVAILABLE (DATA HAS BEEN UPDATED) |
| (IV) | (R, W) =(0, 1) | CACHE DATA UNAVAILABLE (WRITING HAS BEEN ALREADY PERFORMED) |

NETWORK BOOT SYSTEM

BACKGROUND OF THE INVENTION

This application is a U.S. national stage application of PCT application PCT/JP2009-059808, filed May 28, 2009, and claims the benefit of priority from Japanese patent application 2008-140739, filed May 29, 2008.

1. Field of the Invention

The present invention relates to a network boot system which boots an operation system over a network.

2. Description of the Related Art

A system (hereinafter referred to as a "network boot system") which boots an operating system (hereinafter referred to as an "OS") over a network has received attention in recent years. The system is composed of at least one network boot server (I/O server) and a plurality of client terminals connected over a network. Several types of system configurations are available as candidates for the system. The most common one is such that all programs and data such as an OS and application software operating on a client terminal are stored as image data (virtual disk) in a storage device (e.g., a hard disk) on the server side and such that the OS is loaded onto the client terminal over a network when the client terminal is booted.

Japanese Patent Laid-Open No. 2007-323354 discloses a network boot system in which a virtual machine is utilized for a PC (client terminal) that is used by an end user.

In the network boot system, a network boot server which provides an operating system operating on a client terminal and a client terminal are connected to each other over a network, the client terminal includes a physical memory which can temporarily store at least data necessary during boot-up of the operating system and a network interface for accessing the server over the network, and the operating system includes a network driver for driving the network interface and a filter driver for converting access to a local bus of the client terminal into access to the network.

If a network boot system has a mechanism in which a plurality of client terminals share a disk image including OS over the network, each client terminal may be diskless, i.e., need not have a hard disk. The network boot system has the advantage of being able to manage all data including an OS of each client terminal in a centralized manner on the server side. The network boot system is thus suitable for a system in which a large number of client terminals operate.

Since an OS and application software are executed using a CPU and a physical memory of each client terminal, the network boot system also has the advantage of being able to maximize the performance of each client terminal and minimize server loads.

SUMMARY OF THE INVENTION

The present inventors propose a novel network boot system that includes a configuration in which a cache for reading only (hereunder, referred to as "read cache mechanism") is provided in one part of a physical storage device on a client terminal side. A feature of this system is that the system includes a "cache system specialized for reading" in which the client terminal side copies data of a virtual disk for boot-up of the OS of the client terminal that is read from a network boot server over a network to a cache area on the client terminal side, and utilizes only data with respect to which a write operation has not yet been performed as read cache data. According to this system, by caching data of a virtual disk that is read when booting up for the first time on a local disk, there is little network access to the server at the time of boot-up of the client terminal for a second or subsequent time. Hence, there is an advantage that the number of client terminals which can be connected to one server can be dramatically increased compared to heretofore.

However, a fundamental premise of the above described network boot system is that data of a virtual disk that a client terminal side reads is always the same, and a mechanism on the client terminal side for detecting when data of the virtual disk has been revised has not been clarified. If read cache data is utilized as it is when the data of the virtual disk has been revised, there is a risk that a data inconsistency will occur and hinder boot-up of the client terminal. However, it is extremely inefficient to compare the data of the entire virtual disk with the read cache data over a network.

The present invention has been made in view of the above described circumstances, and has as its main technical object to provide a novel mechanism that, when data of a virtual disk has been revised in a network boot system including a client terminal that holds read cache data, allows the client terminal side to efficiently detect the revision information.

In a network boot system according to the present invention, a network boot server which provides a disk image including an operating system operating on a client terminal as a virtual disk and a client terminal including a physical storage device are connected to each other over a network, the client terminal includes a physical memory which can temporarily store data necessary during boot-up of the operating system and a network interface for accessing the server over the network, the operating system includes a filter driver for converting access to a local bus of the client terminal into access to the network, and a read cache driver for driving the storage device, and the read cache driver includes a read cache mechanism that read-caches data read out from the network boot server by the filter driver on the storage device; wherein the read cache mechanism includes a read cache area for holding data received from the server, and a cache management area for writing back at least a part of a management flag for determining by the read cache driver whether the data read out from the server is in an already-written state that is held in the physical memory; the network boot system comprising first storage means that stores a revision of data of the virtual disk, second storage means that stores a revision of the read-cached read cache data, means that compares the first and second revisions, and determination means that determines an operation of the read cache driver based on the comparison result.

According to this system, by comparing a revision of data of a virtual disk and a revision of read cache data, the identity of the contents can be determined without performing a comparison over all sectors of the data of the virtual disk and the read cache data, and it can thereby be determined whether or not cache data stored in the read cache data may be utilized. Thus, it is found that if the revisions are matching the read cache data can be utilized as it is, and if the revisions are not matching the read cache data can not be utilized as it is. This is because if the read cache data is utilized as it is when the revisions do not match, pre-revisal data that is read-cached will be read irrespective of the fact that the data of the virtual disk has been revised, and thus the revisal of the data of the virtual disk will not be reflected in the read cache data. Consequently, there is the concern that operations of the client terminal will become unstable and in the worst case boot-up of the OS will not be possible at the client terminal.

When read cache data can not be utilized as it is, the safest method is for the read cache driver to discard all of the read cache data. In that case, although there is the advantage that the problem of a data inconsistency does not occur, there is also the disadvantage that since even data in sectors that have not been revised is discarded, a read operation must be performed again over the network and the read operation increases the network load.

In the above described network boot system, preferably the first revision is held as a part of the virtual disk or in association with the virtual disk. This is because the first revision can be accessed at a time of boot-up and, furthermore, it is necessary to hold the first revision in a location that leaves a record at the time of a write operation to the virtual disk. In this connection, the term "in association with" refers to a client terminal being able to access the first revision through the virtual disk at the time of boot-up.

In the above described network boot system, preferably the second revision is held in a part of the storage device. The term "the storage device" refers to a physical storage device that the client terminal includes, and specifically refers to a local disk or the like. Because the second revision is a revision of the read cache data, the second revision can be stored in any area inside the local disk, for example, a cache management area (P3).

The above described network boot system may further comprise a write cache area for caching write information from the client terminal, and a flag storage area of at least one bit in a part of the virtual disk. This is because, since the client terminal necessarily operates at least either one of these two flag management areas at a time of boot-up, it is possible to check whether a change has been made to the data of the virtual disk.

The above described network boot system may be configured so that when the client terminal is booted in a share mode in which a plurality of client terminals share and use a virtual disk on a server, 1 is written in a flag management area provided in the write cache area, and when the client terminal is booted in a private mode in which a client can directly write to a virtual disk on a server, 1 is written in a flag management area provided in a storage area of the virtual disk; and the client terminal starts or stops the read cache mechanism based on a value stored in the flag management area provided in the storage area of the virtual disk at a time of boot-up. This is because according to this configuration information written in the flag management area is also held after OS rebooting. Hence, by merely checking the value of a management flag stored in the flag management area provided in a part of the virtual disk at the time of rebooting, the client terminal can determine if writing has been performed to the virtual disk and whether the updating operation thereafter has been completed.

Preferably the above described network boot system generates a changed area map that shows areas in which data has been changed in the virtual disk between two different revisions among the first revisions, and generates a post-revisal cache management table by applying the changed area map to a cache management table that represents a state of read cache data in a pre-revisal revision. The term "changed area map" refers to revision history management information that records and associates information that shows which the areas in which data has been revised among the data of the virtual disk between revisions. The changed area map is represented by information of one bit (0 or 1). Since the existence or non-existence of a change is recorded in sector units, when 0 is written in a cache management table of read cache data corresponding to a sector that "has changed", data that is read-cached in that sector is discarded and a read operation from the virtual disk is performed again. In contrast, since a cache management table of read cache data corresponding to a sector that "has not changed" can be utilized without discarding the read cache data, it is not necessary to discard the read cache data. Thus, when a changed area map is applied to a cache management table, even when data of the virtual disk has been revised it is possible to minimize the amount of data that is discarded.

In the above described network boot system, preferably the changed area map is stored in a part of the virtual disk. This is because, although a storage location of the changed area map is not particularly limited, since it is necessary that all client terminals that have read cache data know information regarding changes of data of the virtual disk, it is rational to provide the changed area map in a part of the virtual disk.

Preferably, the above described network boot system comprises changed area map summarization means that generates a summarized map of consecutive changed area maps by determining a logical OR of changed area maps between consecutive revisions among the first revisions. This is because a changed area map is a bit string comprising 0s and 1s, and if 1 is assigned to a bit corresponding to a changed sector, summarization can be easily performed by determining the logical OR.

According to the present invention, even when data of a virtual disk has been changed, by comparing a revision of the virtual disk and a revision of read cache data it is possible to determine the identity of the contents thereof without checking the entire virtual disk.

Further, when a configuration is adopted in which a "changed area map" that shows revision information of the virtual disk is applied to a "cache management table" that manages a state of read cache data of a client terminal, it is possible to minimize the number of sectors for which read cache data is discarded. Therefore, even when data of the virtual disk has been changed, it is possible to reduce network loads by reflecting the data of the virtual disk after the data change in the read cache on the client terminal and utilize the read cache on the client terminal.

BRIEF DESCRIPTION OF THE DRAWINGS

FIG. 3 shows an example of the disk configuration on a client terminal side in the network boot system of the first embodiment;

FIG. 6 is a chart showing a list of rules relating to a dirty flag;

FIG. 8(A) shows an example of a changed area map with respect to changes from revision 12 to revision 13, FIG. 8(B) shows an example of a cache management table 70a of revision 12, and FIG. 8(C) shows a cache management table of revision 13 that is generated by applying the "changed area map" for changes from revision 12 to revision 13 shown in FIG. 8(A) to the "cache management table" of revision 12 shown in FIG. 8(B);

FIG. 13(A) shows an example of a cache management table, FIG. 13(B) is a chart showing a list of correspondences between states of the cache management table and associated operations;

DETAILED DESCRIPTION OF THE PREFERRED EMBODIMENTS

Terms in this specification are to be interpreted in the manner below. Note that other terms not defined here will be pointed out later as needed, and that the following definitions are not limited to the embodiments (examples).

The term "server" refers to at least one computer which provides an operating system operating on a client terminal. A server holds, as image data, a virtual disk containing an OS to be used by a client terminal, application software, and other data, and includes a case where the real storage of the image data is in a physical disk of another server, such as a file server on a network.

The term "virtual disk" refers to a disk image (which may be referred to as a "vDisk") visible to an OS on a client terminal over a network. A virtual disk itself is a part of data stored in a physical disk connected over a network.

The term "local" refers to a device connected to an internal bus of a client terminal without the mediacy of an external network such as a LAN.

The term "physical disk" refers to a storage device such as a hard disk which is connected to a local bus and is tangible. The storage device will also be referred to as a "local disk." Note that the type of a hard disk (e.g., a SCSI disk, an IDE disk, or a SATA) is not particularly limited as long as an OS can recognize the hard disk. Physical disks include all feasible storage devices which substitute for a hard disk, such as a semiconductor memory, regardless of whether the physical disks are disk-shaped.

The expression "user data and the like" refers to all data that are saved by an OS of a client terminal or application software operating on the OS when a user operates the client terminal.

The term "OS" alone without any specification refers to an OS operating on a client terminal. Additionally, "write (or read) request signals from the OS side" include a request signal which application software operating on the OS side issues toward a filter driver.

(Basic Principle of Network Boot System)

Figure 12:
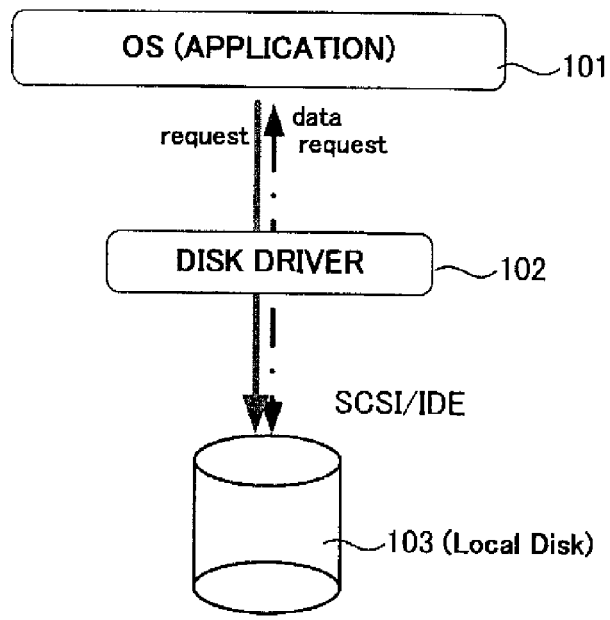
FIGS. 12(A) and 12(B) are diagrams for explaining a disk access relationship in a computer system.
Figure 12:
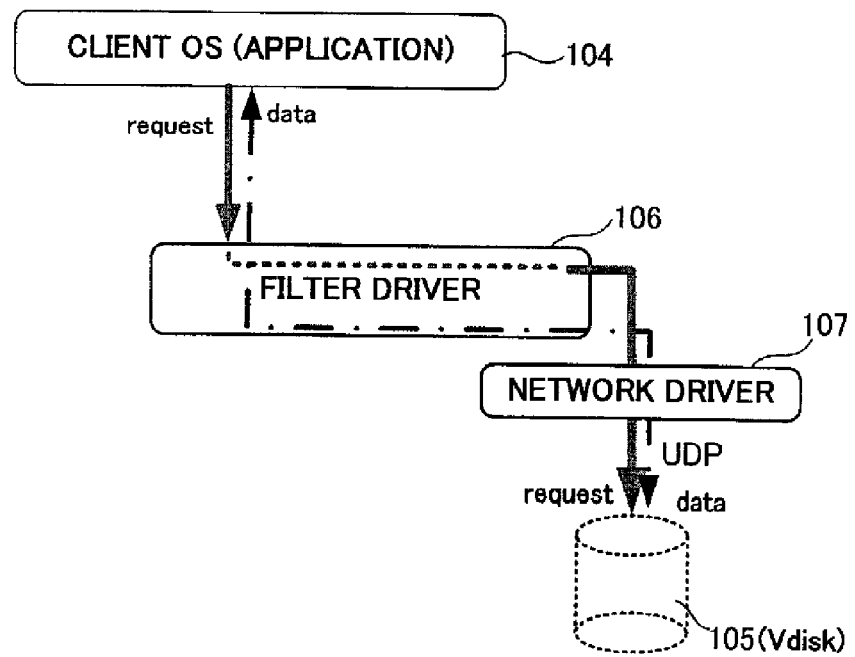

The basic principle of a general network boot system will be briefly described here. FIGS. 12(A) and 12(B) are diagrams for explaining a disk access relationship in a computer system.

FIG. 12(A) is a diagram for explaining a mechanism in which a general computer system reads and writes data from and to a local disk. When an OS or application software 101 on a client terminal sends read and write request signals to a local disk 103, a disk driver 102 controls reading and writing of data from and to the local disk 103 in accordance with the request signals.

FIG. 12(B) is a diagram for explaining a mechanism in which a network boot system reads and writes data from and to a virtual disk (vDisk). When an OS or application software 104 sends read and write request signals to a virtual disk 105, a filter driver 106 first receives the request signals instead of a disk driver, transfers the request signals to a network driver 107, and controls reading and writing of data from and to a disk image whose real storage is on a server located across a network and the like (the virtual disk 105) through a network interface (not shown).

As described above, the filter driver 106 of each client terminal converts access to the local disk into network access. With this conversion, a CPU of the client terminal accesses a disk image on the server connected over the network instead of accessing the local disk.

A "filter driver" here is a type of device driver which operates on an OS on the client terminal side. A network driver is provided downstream from the filter driver. The network driver communicates with a virtual disk (vDisk) on the server side through a network interface (e.g., an Ethernet card) and transfers data on the basis of a received request signal for disk access. That is, if the virtual disk receives a read request signal, it returns data to the client terminal side. On the other hand, if the virtual disk receives a write request signal, data is written to the virtual disk.

First Embodiment

Revision Management—A first embodiment of a network boot system according to the present invention will be described in detail below with reference to the drawings. Note that sections [1] to [4] below exemplify an embodiment of a network boot system that includes a read cache mechanism that is taken as a premise of the present invention, and section [5] describes revision management (a method of managing revision information) that is premised on use of this kind of system.

[1] Overall Configuration of System: FIGS. 1(A) and 1(B) are conceptual views for explaining the basic configuration of the network boot system according to the first embodiment. As shown in FIG. 1(A), in the system, at least one server (network boot server) 10 and a plurality of client terminals 20 (20*a*, 20*b*, . . . ) are connected over a network. As shown in FIG. 1(B), the server 10 includes a physical disk (e.g., a hard disk) 11. The server 10 includes basic components of a server, such as a CPU and a memory (not shown), in addition to the physical disk 11. The client terminals 20a and 20b include a local disk 21a. Note that a "client terminal without a local disk" may be included as a part of the whole system.

A disk image (vDisk) 22a of a common OS that the client terminals 20 (20a, 20b ...) read at the time of initial boot-up is stored in the physical disk 11 of the server 10. More specifically, according to this system it is assumed that a plurality of client terminals share a disk image of an OS that is stored in the physical disk 11 of the server 10.

Note that a configuration may also be adopted in which images of a plurality of different OSes such as a first OS, a second OS, a third OS ..., are stored in different areas in the physical disk 11, and a selection regarding which OS to boot-up is made at the time of boot-up on the client terminal side. However, to simplify the description, a form in which a plurality of OSes are selectively booted is described in detail in the fourth embodiment.

Figure 1:
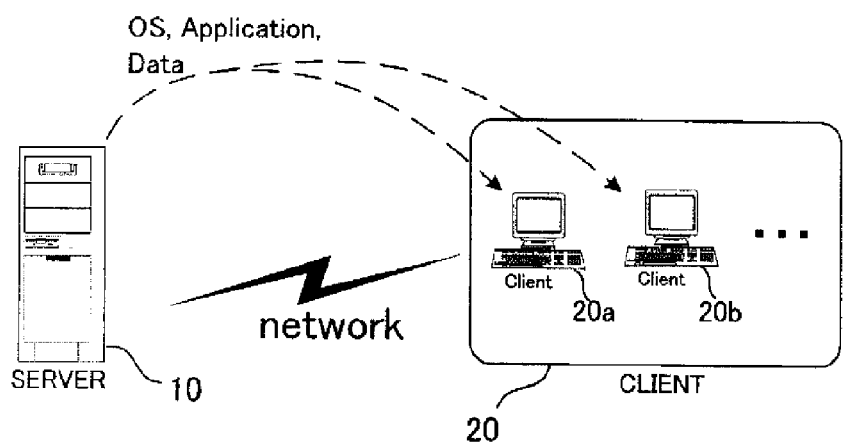
FIG. 1 is a conceptual view for explaining the basic configuration of a network boot system according to a first embodiment.
Figure 1:
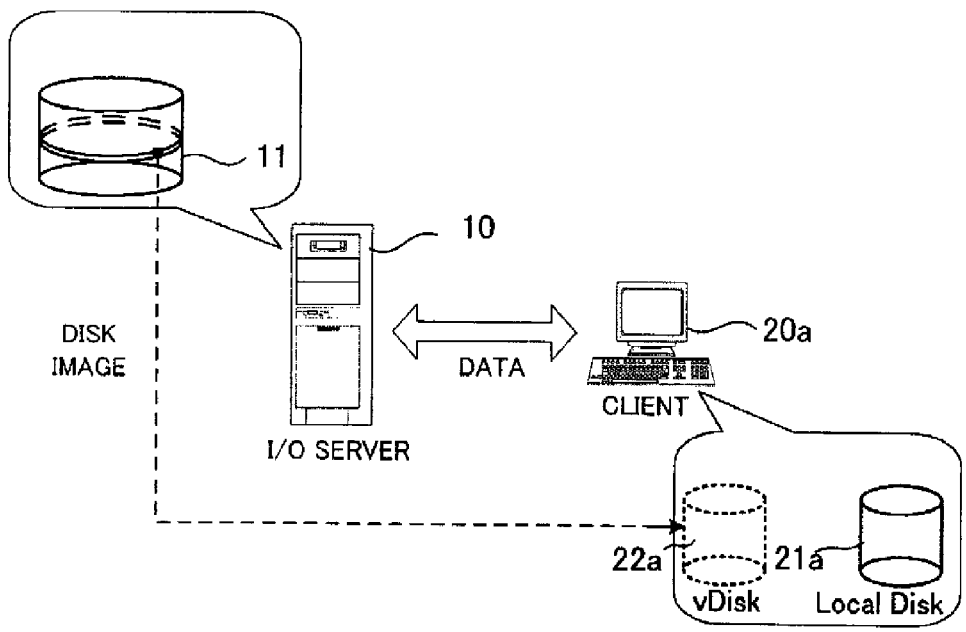
Figure 2:
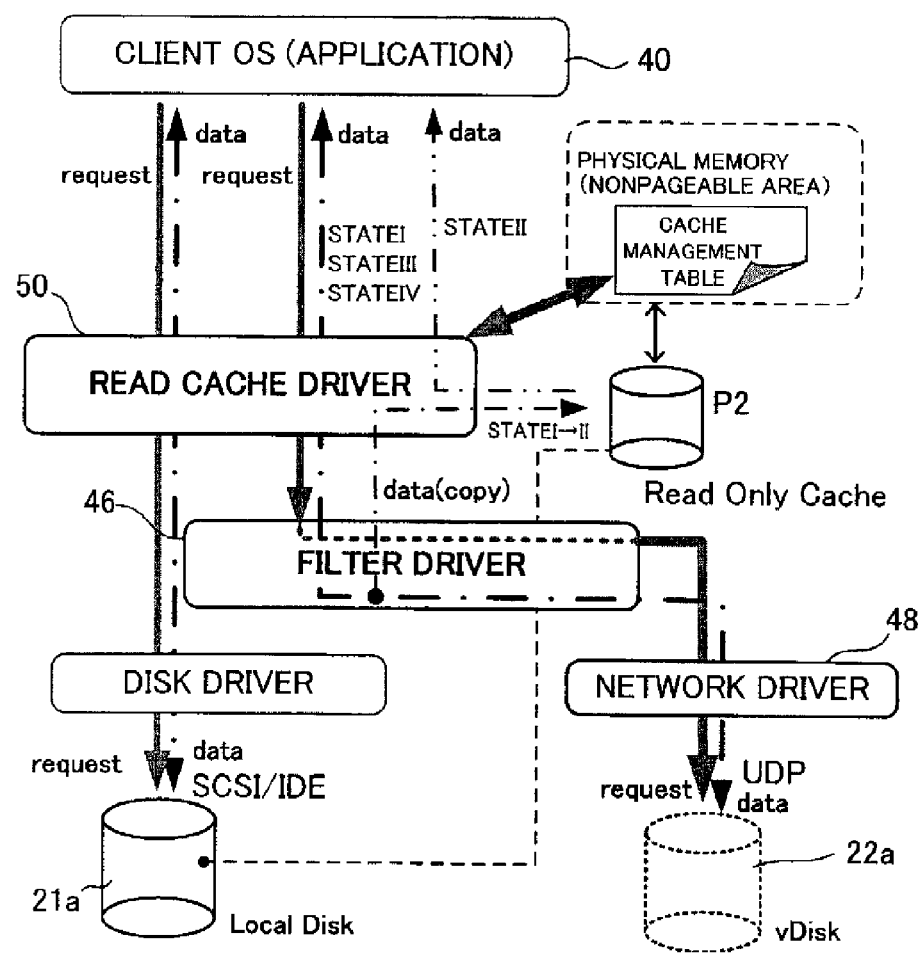
FIG. 2 is a diagram for explaining a disk access relationship in the network boot system of the first embodiment.

FIG. 2 is a diagram for explaining a disk access relationship in this system. As described above, each client terminal of the system has a local disk 21a and a virtual disk 22a. For this reason, the basic operation is such that access to the local disk 21a is gained through a disk driver via an internal bus (not shown) (e.g., a SCSI bus or an IDE bus) whereas access to the virtual disk 22a is gained through a filter driver 46 and a network driver 48 over the network. More specifically, the disk image on the server is mounted in an OS on the client terminal over the network. It seems to the client terminal that the virtual disk 22a is connected over the network (see FIG. 1(B)).

It is assumed that this system also includes a "read cache driver 50" that is specialized for reading upstream from the filter driver 46. The read cache driver 50 accesses data in (writes data to and reads data from) a read cache area (a partition P2 in FIG. 3(A) described later) assigned to a specific partition in the local disk 21a. The read cache driver 50 functions to copy and read-cache data read out from the server by the filter driver 46 in the local disk.

However, even if the data has already been read out from the server over the network, if the data belongs to a sector for which a writing operation has been performed even once thereafter, the data is not utilized because the contents of the data have been rewritten. To implement this, the client terminal holds a flag of two bits that is referred to as a "cache management table" for each sector. The details of this mechanism will be described in "[4] System Operation."

[2] Disk Configuration on Client Terminal Side: FIGS. 3(A) and 3(B) are views showing the disk configuration on the client terminal side. As shown in FIGS. 3(A) and 3(B), the client terminal includes the local disk 21a and the virtual disk (vDisk) 22a.

As described above, a virtual disk is treated as a logical drive (which may also be referred to as a "network drive" depending on the OS) which seems to a client terminal to be located across a network. An OS system and user data can be stored as a disk image on the server side over the network as if they are stored in a local disk of a user. A physical hard disk of a client terminal (referred to as a "local disk") is directly connected to an internal bus.

(1) Configuration of Physical Disk: FIG. 3(A) is a diagram for explaining the configuration of a physical disk. The physical disk is the local disk directly connected to the client terminal side. In this embodiment, each physical disk is divided into at least three areas (partitions).

FIG. 3(C) is a chart for explaining an example of functions to be assigned to a first partition P1 and corresponds to descriptions (i) to (iii) below. Note that the first partition P1 is recognized as a logical drive or files and directories by an OS on the client terminal side whereas second and third partitions (P2 and P3) are not recognized at the application level (e.g., as a logical drive or files and directories) but only at the physical level (e.g., as sectors or clusters) on the local disk.

(i) First Partition P1: A "swap area" of the OS on the client terminal side, a "write cache," and a "work area for application software operating on the client terminal side," and the like can be assigned to the first partition P1 of the physical disk as needed. Although the first partition P1 is not essential for the present invention (First Embodiment), creation of the first partition P1 has the advantage of increasing the throughput of each client terminal.

a. Swap Area: The term "swap" refers to one of OS functions using a part of a local hard disk as a memory in order to compensate for a physical memory shortage in a client terminal. Swap operation refers to the operation of preparing a "swap area" in a hard disk, temporarily saving on the hard disk the contents of an area of a memory not in use when available memory becomes low, and writing the contents back to the memory as needed. A memory area beyond an actual memory capacity which is reserved using the function is referred to as a "virtual memory." If a client terminal is diskless, a swap area cannot be provided on the client terminal side. Data overflowing a memory are all sent to a swap area on the server side. This consumes resources of the server and causes imposition of network loads. However, each client terminal includes a local disk in the network boot system according to the present invention, and a swap area can be reserved at a part of a physical area. The prevention of swap operation on the server side over a network is a major advantage.

b. Write Cache: If a write request signal is sent from an OS or the like 40 on the client terminal side to the filter driver 46, write data is cached in a physical area of the local disk. The physical area can be used as a so-called "write cache." The "write cache" can also be used as a "read cache" (note that cached data read out as the "read cache data" includes data after writing of user data and the like). The write cache allows update information for the client terminal such as user data to be stored on the client terminal side and has the advantage of reducing network loads.

c. Work Area for Application Software: Assignment of a work area for application software operating on the client terminal side has the advantage of reducing network loads.

(ii) Second Partition P2: A "read cache area" that is a dedicated area for performing "read-cache" operations is assigned to the second partition P2 of the physical disk. Data after writing is never stored in this area. In this context, the area is totally different in technical significance from the area described in "(i) b. Write Cache."

The read cache data stored in the second partition P2 utilizes only data in a sector on which writing has never been performed, and does not utilize all of the copied data that has been read out over the network. If data stored on the virtual disk has been changed, there is a risk that a data inconsistency may occur. Hence, as read cache data, a revision of a read-cached disk image (referred to as "read cache data revision") is held in the second partition.

This operation will be briefly described here. Values for four different states (a flag of two bits) are held for each sector. More specifically, the four different states relate to the existence or non-existence ("existence" or "non-existence") of read cache data inside a certain specific sector that is being held in a certain read cache area, and whether or not the relevant sector is in an already-written state ("already-written state" or "unwritten state"). The read cache data is utilized only when "read cache data exists" and the relevant sector is in an "unwritten state". In other cases, operations are performed so as not to utilize the read cache data.

In this context, note that in the present specification the above described "read cache mechanism" is a concept that does not include a "write cache". However, it is permissible to have a "read and write cache" that also holds a write state separately in a different area from the aforementioned "read cache". As described above, the network load is reduced when a "read and write cache" is provided in a local disk on the client terminal side. Write information for each client terminal may also be stored on the server.

(iii) Third Partition P3: The physical disk on the client terminal side has a "cache management area (P3)" as well as the read cache area (P2). The read cache driver reads the cache management area to a "cache management table" retained in a nonpageable area (an area which is not swapped) in the physical memory, and periodically writes back the "cache management table" to the cache management area. The cache management area stores information that shows "the sectors of the virtual disk whose data is cached" and information that shows "whether or not writing has been performed in the sectors" in sector units. Hence, even if data exists in the read cache, if writing has been performed in the sector in question, the data is excluded as an object of the read cache and reading of the data is performed again without utilizing the read cache. By means of this mechanism, only data for which writing has not been performed is taken as the object of the read cache, and the cache data is stored in the local disk of the client terminal side until after OS rebooting.

(2) Configuration of Virtual Disk: FIG. 3(B) is a diagram showing the configuration of the virtual disk. The virtual disk is recognized by the OS on the client terminal, and its real storage is a part of a hard disk of the server on the network. In this embodiment, the whole of the virtual disk is divided into at least two areas (partitions). A first partition (indicated by "V1") is a logical drive (e.g., drive C) which is recognized by the OS on the client terminal side, whereas a second partition (indicated by "V2") is an area which is not recognized by the OS on the client terminal side. Revision information (revisions and the like described later in "[4] Revision Management") of the virtual disk is stored in the second partition V2. Each time a disk image is revised, revision information and the like are written by a program on the server side.

Note that since each client terminal mounts an OS as a virtual disk in image data units, it is also possible to hold a plurality of OS images in any physical disk on the network that is the real storage of the virtual disk, and to select an OS at the time of boot-up on the client terminal side and use one client terminal in different operating environments.

Note that since the amount of data of revision information is extremely small, the size of the second partition V2 may be extremely small compared to that of the first partition V1. For example, if the size of the first partition is 15 to 30 GB, it is sufficient to secure about 10 MB for the second partition.

In summary, drives whose presence can be confirmed on the OS by a user of the client terminal in this embodiment are a logical drive (e.g., C drive) corresponding to the first partition V1 of the virtual disk and some logical drives corresponding to the first partition P1 of the physical disk.

[4] System Operation: (1) Basic Operation of "Read Cache Driver": First, the basic operation of a "read cache driver" will be described. Referring to FIG. 2, solid arrows pointing from the "client OS (application)" 40 toward the local disk 21a and the virtual disk 22a indicate read or write request signals (request signals). Upon receipt of the request signals, the device drivers communicate with the corresponding disks and transfer data. Alternate long and short dashed arrows adjacent to the request signals indicate data transfer. For example, if a read request signal is issued, data is read out from the disk side and is sent out to the OS side. On the other hand, if a write request signal is issued, data is sent out from the OS side to the disk side and is written to the corresponding disk.

The read cache driver is a program for performing "read-caching" of the read cache area (P2) of the local disk, and the operation is as described below.

(i) Processing of Read Request Signal: If the OS (or application software) 40 on the client terminal side sends out a "read request signal," the read cache driver 50 receives the "read request signal" ahead of the filter driver 46. In this case, the read cache driver 50 determines whether there is corresponding data stored in the "read cache area" assigned to the second partition P2 of the physical disk and whether, if there is corresponding data, the data is in an already-written state, using a "cache management table." If the data is in an already-read state and not in an already-written state, the read cache driver 50 immediately returns the read cache data to the OS. If the read cache data is in an already-written state or if there is no corresponding read cache data, the read cache driver 50 sends the received "read request signal" to the downstream filter driver 46 without processing. Note that when the filter driver 46 receives the "read request signal," data is read out from the server side over the network driver 48, as usual.

(ii) Update of Read Cache Data: In case (i) described above, finally, the data read out from the server side passes through the filter driver 46 and the read cache driver 50 in this order and is sent out to the OS 40 side. At this time, the read cache driver 50 copies the data read by the filter driver 46 to the "read cache area" assigned to the second partition P2 of the physical disk and stores the fact that the read cache data is in an already-read state by changing a flag in the cache management table on a physical memory.

(iii) Processing of Write Request Signal: If the OS (or application software) 40 of the client terminal sends out a "write request signal," the read cache driver 50 receives the "write request signal" ahead of the filter driver 46. However, when the read cache driver 50 receives the "write request signal," it sends the "write request signal" to the downstream filter driver 46 without special processing. Note that when the filter driver 46 receives the "write request signal," it writes data to the predetermined write area on the server side over the network driver 48, as usual.

(2) Mechanism of "Cache Management Table": FIG. 13(A) shows the "cache management table." In the cache management table, management flags of two bits are assigned to each read unit of the local disk (physical disk) to hold two values (states) to be described below. The management flags are retained in a nonpageable area (an area whose data is not saved on the swap area) on the physical memory.

(i) Management Flag: The "cache management table" stores the state of read cache data using two management flags. The flags are each initially set to 0. (a.) Read Management Flag (0 or 1); (b.) Write Management Flag (0 or 1)

(ii) If read cache data is absent, and data which is received by the filter driver as a response to a read signal from the OS is copied, data of the read management flag is changed from 0 to 1 in order to store the fact that the read cache data is in an already-read state. That is, a read management flag of 1 indicates that there is corresponding read cache data. However, whether the read cache data has been updated by writing after the copying cannot be determined only from the read management flag.

(iii) If the filter driver receives a "write request signal" from the OS, as described above, the read cache driver sends data to the filter driver without special processing, and the data is written to the virtual disk on the server side through a network interface. At this time, the state of the write management flag is changed from 0 to 1. That is, if the read management flag is 1, and the write management flag is 1, writing has been performed after the change of the read management flag to 1, and the contents of the read cache data have been changed from an initial state. The values of the management flags mean that the read cache data should not be used any more in response to a read request signal for a corresponding sector. After the write management flag is changed to 1, the state of the write management flag is maintained until the OS on the client terminal side is shut down. In other words, "whether data in a certain sector has already been written" can be determined by checking whether a "write request signal" for the sector has ever been received.

FIG. 13(B) is a chart showing a list of correspondences between states of the cache management table and associated operations. State I is a state in which there is no corresponding read cache data. In this state, reading of data is delegated to the filter driver 46. When the filter driver 46 passes received data to the OS 40 side, the data is copied as the read cache data, the value of the read management flag is changed to 1, and transition to state II is made on the cache management table. State II is a state in which the read cache data is available. The contents of the read cache data are immediately returned in response to a read request signal. State III is a state in which the write management flag is 1 and indicates that the cache data is in an already-written state. Accordingly, the cache data held in a sector concerned should not be used any more. State IV is a state in which a write request signal is sent without a single read operation after boot-up of the OS. Since the write management flag is 1 in this case as well, the cache data held in the sector concerned should not be used any more. Note that each management flag always transits from state I to state II and from state II to state III or from state I to state IV, as will be described later.

As described in "(2) (i) b.," a cache area for holding already-written data may be further provided at a part of the local disk on the client terminal side by assigning a write cache to the first partition P1 of the physical disk, and network loads may be reduced by using the cache area as the write cache. Note that the write cache area (P1) needs to be provided in the area different from the "read cache area (P2)" described above.

Figure 14:
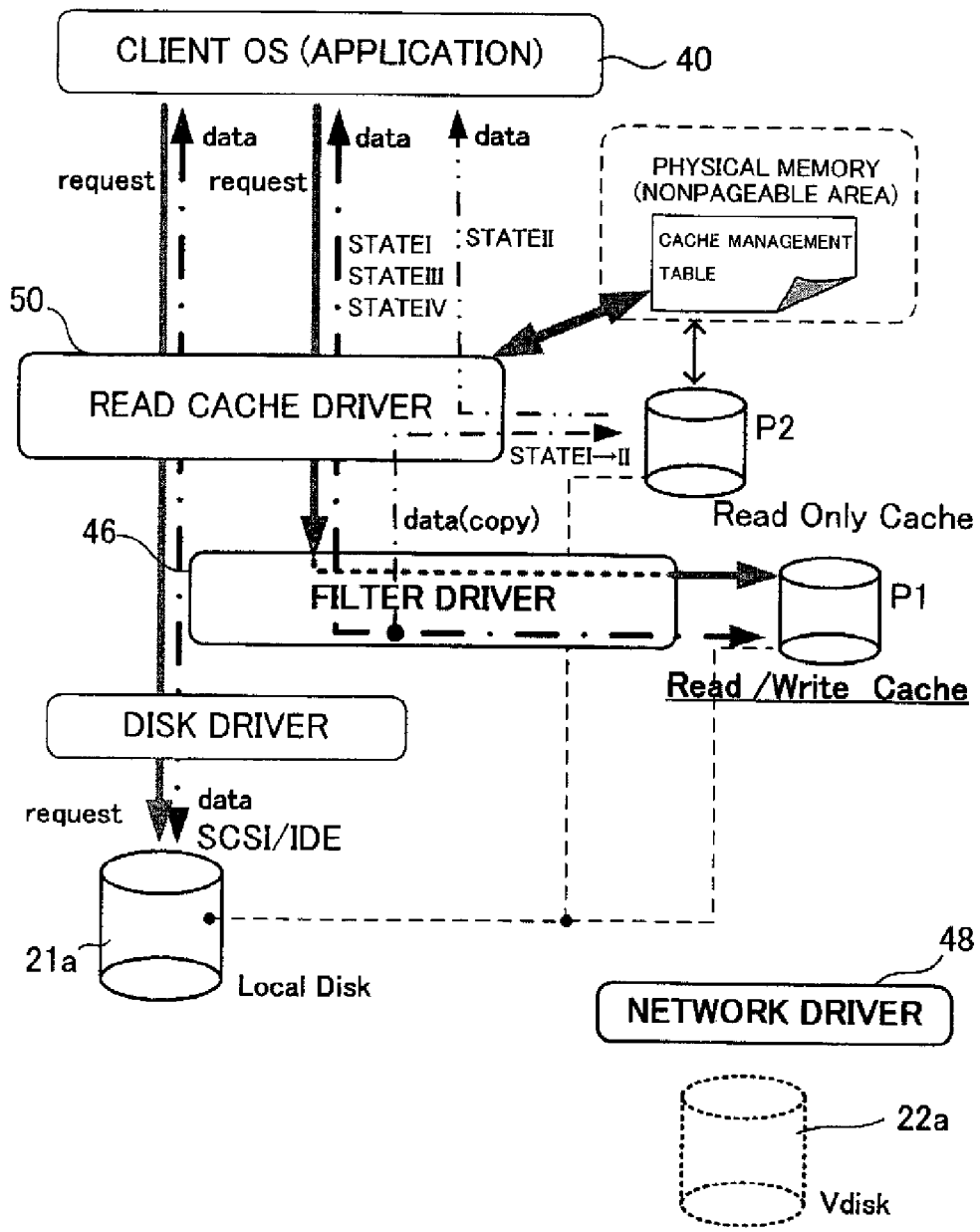
FIG. 14 is a view that describes a disk access relationship in a case where a write cache is provided.

FIG. 14 is a view that describes a disk access relationship in a case where a write cache is provided.

(iv) Backup of Cache Management Table: Since management flags are loaded into a nonpageable area (an area whose data is not saved on the swap area) of the physical memory, the contents of the flags are deleted when the OS is rebooted. In order to use read cache data after rebooting of the OS, the state of each read management flag before the rebooting of the OS needs to be held. To this end, the state of each read management flag is periodically backed up to the "cache management area" at the third partition (P3) of the physical disk. The backup operation may be performed asynchronously to data reading and writing with the filter driver. Note that even if a synchronization failure occurs (update occurs during a synchronization interval), use of read cache data for a sector concerned is abandoned, and processing is delegated to the downstream filter driver. This is because if a corresponding read management flag transits to state I, and reading from a disk image on the server side is performed again, data inconsistency does not occur for the read cache.

After boot-up of the OS, a "read management flag" and a "write management flag," two bits in total, are necessary for each read unit (sector) in the cache management table. For example, in the case of a SCSI disk, one sector equals 512 bytes. A two-bit physical memory is necessary for each unit of 512 bytes. However, since write management flags are all reset to 0 after rebooting, the "cache management area (P3)" for storing the state of the cache management table needs to store only the state of each read management flag. At least one bit of disk space per 512 bytes, i.e., a cache management area of 0.25 MB (megabytes) per read cache data of 1 GB (gigabyte) is necessary.

Note that, in actual operation, reliability is preferably enhanced by periodically and alternately writing data of each "read management flag" to at least two or more different spots in the cache management area in order to increase the use efficiency of read cache data. If an operation mode in which two backup copies are saved is adopted, the required size of the cache management area is 0.5 MB (megabytes) per read cache data of 1 GB (gigabyte). For example, if the read cache data area has a size of 30 GB (gigabytes), the required size is 15 MB (megabytes).

(v) Summary: (a.) If a write management flag and a read management flag are both 0, there is no corresponding read cache data. Accordingly, the read cache driver 50 delegates processing of a read request signal from the OS 40 side to the downstream filter driver 46, copies data received by the filter driver 46 to the read cache partition (P2), and changes the read management flag from 0 to 1 (state I to state II).

(b.) If the write management flag is 0, and the read management flag is 1 (state II), the read cache driver 50 returns data read out from read cache data in response to a read request signal from the OS or the like 40.

(c.) If the read cache driver 50 receives a write request signal, it does not use read cache data. The read cache driver 50 always passes a read request signal from the OS 40 side to the downstream filter driver 46, delegates subsequent processing of the read request signal to the downstream filter driver 46, and changes the write management flag from 0 to 1 (state II to state III). If writing is performed on an area on which reading has never been performed since OS has been booted, of the read management flag and the write management flag of 0, only the write management flag is changed to 1 (state I to state IV). If the write management flag is 1 (state III and state IV), read cache data should not be used.

(d.) If image data on the server side has been updated, if cache data has been corrupted, or in other cases, the read management flag and the write management flag are both changed to 0.

With the above-described configuration, if there are a large number of client terminals which have performed a network boot once, the client terminals each can be booted not over a network but using cache data in the local disk for a second or subsequent time. Accordingly, network loads can be dramatically reduced.

In particular, even if a large number of clients with cache data are simultaneously booted, there is almost no network access, and every client can be booted at a comparable speed to its local disk. As a result, the number of client terminals which can be connected to one server can be significantly increased. Sectors for which writing is performed are excluded from caching, and pieces of read cache data for sectors except for the excluded sectors are saved until after OS rebooting. Accordingly, the more often client terminals are used, the more network loads are reduced.

Additionally, since the cache in this system is a cache specialized for reading, if reading of data is unsuccessful, e.g., in the event of a hard disk failure, the client terminal is booted by a network boot using a virtual disk image. Accordingly, the client terminal can also operate as a conventional diskless terminal.

If a swap area, a work area for application software, and a write cache area are separately reserved in addition to a read cache area, each client terminal operates more comfortably.

[5] Revision (revision information) Management: In the network boot system, initially, it is necessary to create a boot image of the OS of the client terminal on the server side. The client terminal side mounts the boot image as a virtual disk over the network, and boots the boot image. At this time, on the client terminal side the aforementioned read cache driver sequentially holds the data that is read over the network. Hence, when a read request is received again for data that has been read once (more precisely, data for which writing has not been performed thereafter), the read cache data is utilized for a second or subsequent time. More specifically, if read cache data exists, the boot-up speed is dramatically improved for a second or subsequent boot-up.

However, when the data of the virtual disk has been revised, the revised data cannot be reflected in the read cache data as it is. Note that examples of a cause for revising data of the virtual disk include updating the OS or a virus pattern, new installation of a program, and changing various settings on the OS.

Figure 4:
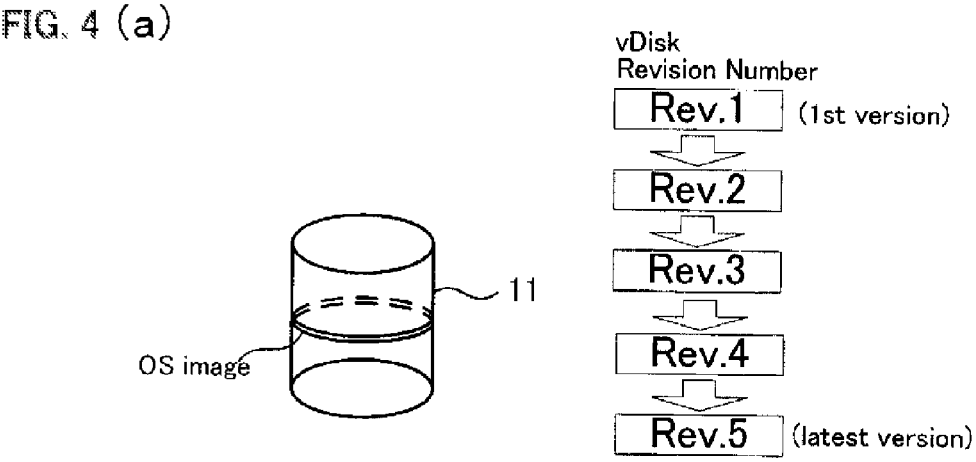
FIG. 4(A) shows a disk image of a virtual disk included in a physical disk 11 that serves as the real storage of the virtual disk on a network as well as transitions in the revision numbers (revisions) of the virtual disk.
FIG. 4(B) shows a plurality of client terminals that exist in the system.
Figure 4:
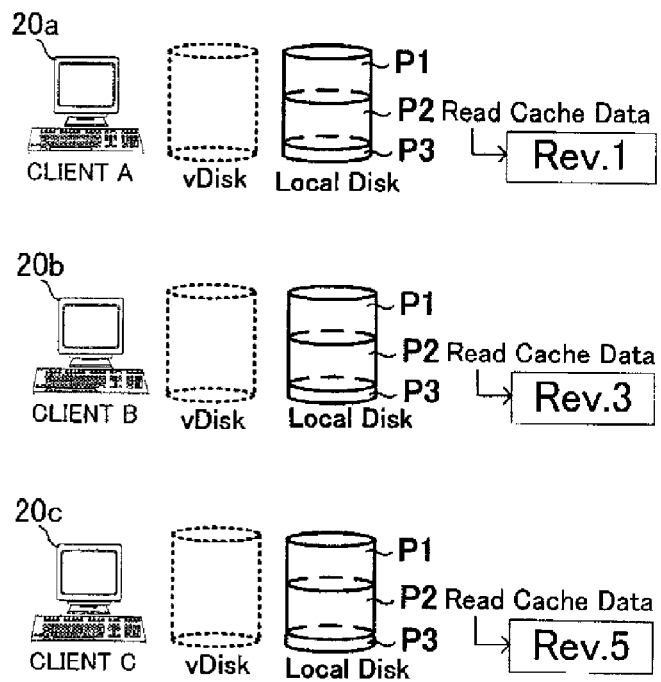

FIG. 4(A) shows a disk image of a virtual disk included in a physical disk 11 that serves as the real storage of the virtual disk on a network as well as transitions in the revision numbers (revisions) of the virtual disk. The revision numbers represent the temporal positional relationship, and assigning revision numbers so as to increase sequentially enables easy comparison of the temporal positional relationship by comparing the size relationship. According to this example, it is shown that revisions of data of the current virtual disk have transitioned from revision 1 to revision 5 and the latest revision is revision 5.

FIG. 4(B) shows a plurality of client terminals 20a to 20c that exist in the system. Although each of the client terminals 20a to 20c has a read cache partition P2 in the local disk thereof, the read cache data revisions held by the client terminals 20a to 20c are different to each other. For example, a client terminal A holds cache data of revision 1, a client terminal B holds cache data of revision 3, and a client terminal C holds cache data of revision 5.

Since the read cache data held by the client terminal C matches revision 5 that is the latest revision, it is safe for the client terminal C to utilize the read cache data and a data inconsistency will not occur.

In contrast, the read cache data of the client terminals A and B are older than the latest revision (revision 5). Hence, a data mismatch will occur if the read cache data that is held in the local disk is utilized as it is. More specifically, data in a certain sector that is read-cached will not match data in the same sector on the vDisk, and thus the client terminal will read data that differs to the data that should be read. There is a fear that this situation will make operations on the client terminal side unstable, and in the worst case there is the risk that it will not be possible to boot the OS.

For this reason, areas are provided that store the data of the virtual disk and the current revision of the read cache data, respectively, and it can be determined whether the read cache data may be used by determining whether the data of the virtual disk and the current revision of the read cache data are matching.

If the data of the virtual disk and the current revision of the read cache data match, the read cache data is utilized as it is. If the data of the virtual disk and the current revision of the read cache data do not match, all of the read cache data is discarded and read-caching is performed again so that the read cache can be operated safely.

Note that revision numbers only need to represent the temporal positional relationship. Accordingly, time information may be utilized as the revision numbers.

Modification of First Embodiment

Figure 15:
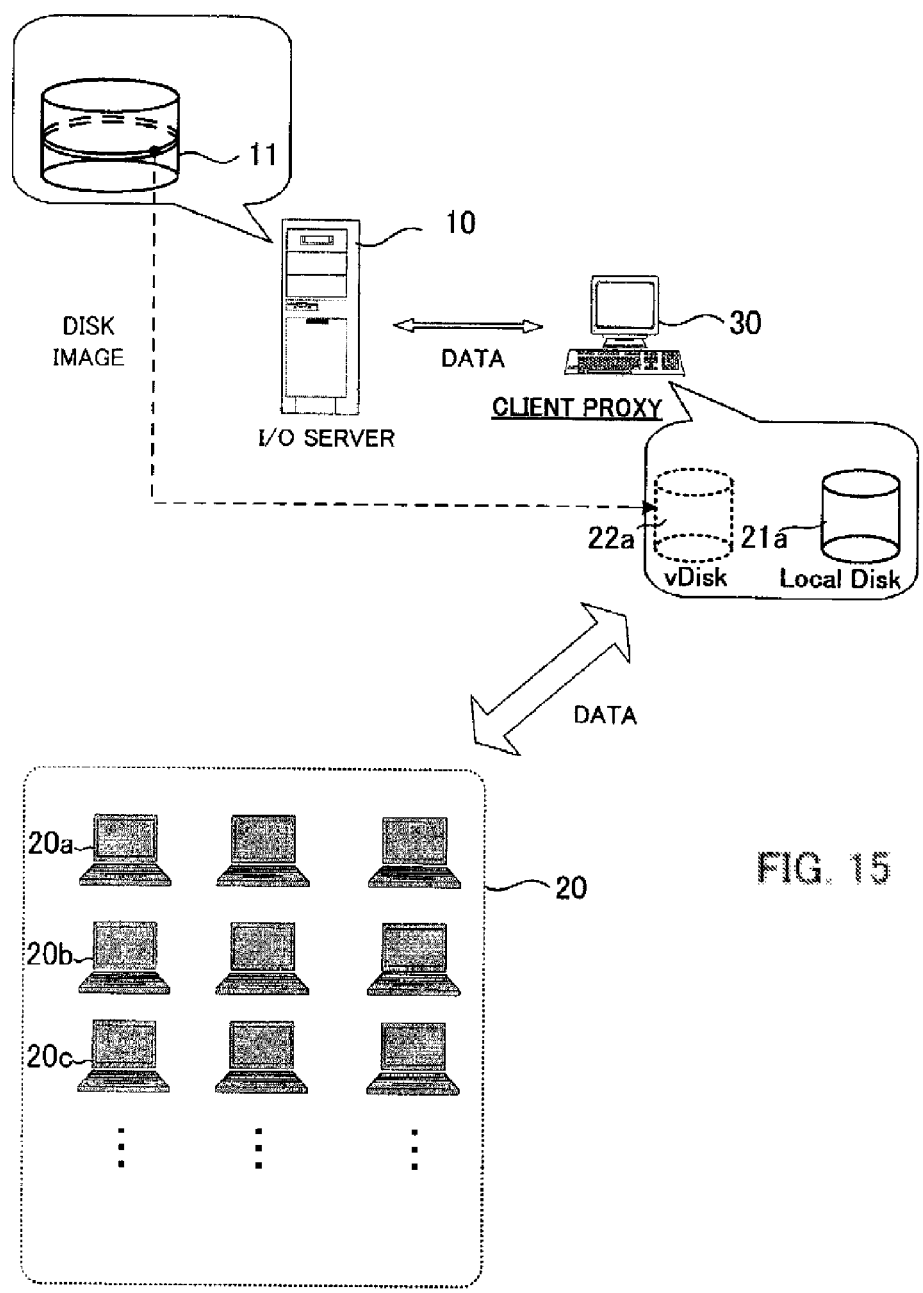
FIG. 15 is a diagram for explaining a modification of the first embodiment.

As shown in FIG. 15, a client proxy (representative terminal) 30 may be provided that holds the local disk at a location that is independent from the client terminals. If high-speed communication can be secured between the client terminals 20 (20a, 20b, . . . ) and the client proxy 30 by placing the client terminals 20 (20a, 20b, . . . ) and the client proxy 30 inside the same LAN or the like, since the client proxy 30 serves as a representative for exchanging data with the server 10, the network between the server and the proxy may be a "low speed" or "high latency" network. The term "when a client terminal includes a physical storage device" used in the present specification is interpreted as including a case where the client terminal side does not include a physical storage device (local disk) because the client terminal utilizes the client proxy 30 that includes a local disk.

Second Embodiment

Dirty Flag (already-written state flag): The network boot system normally has two operation modes, namely a "share mode" and a "private mode". The share mode is a mode in which a plurality of client terminals share and use a virtual disk on a server. The share mode is for operating the system in a normal operating environment. In contrast, the private mode is a mode in which a client can directly write to the virtual disk on the server. The private mode is for operating the system in a maintenance environment. When a client terminal is booted in a state in which the private mode has been set, changes can be made to the data of the virtual disk. Examples of such changes include updating or newly installing an OS or program, or changing settings.

Setting of the operation mode is performed on the server. Normally a client terminal cannot know if the current mode is the share mode or the private mode.

When a client terminal is booted in share mode, the client terminal cannot send write data directly to the virtual disk. Hence, the client terminal stores write data in a predetermined write cache that is provided in each client. The storage area of the write cache varies depending on the system. For example, a write cache area (for example, the physical partition P1 shown in FIG. 3(A)) of the local disk on the client side, a physical disk on the server side, or a file server provided on a network and the like are predetermined data storage areas that are provided for each client terminal, and are each different to the virtual disk in which the boot image of the OS is stored.

When a client terminal is booted in private mode, the client terminal can send write data directly to the virtual disk and can make changes to the data of the virtual disk.

More specifically, in a case where a client terminal stores write data, if the client terminal has been booted in share mode the client terminal stores the write data in a predetermined write cache, whereas if the client terminal has been booted in private mode the client terminal stores the write data in the virtual disk. Naturally, the client terminal itself is normally unable to select the storage destination of the write data, and cannot even be aware of whether the current storage destination is a write cache or a virtual disk.

The conventional procedures when making a change to data of the virtual disk are as follows. First, the system administrator changes the setting from share mode to private mode. Next, the system administrator boots one specific client terminal and updates the data of the virtual disk using the client terminal in question. Subsequently, the system administrator returns the setting from private mode to share mode. Finally the system administrator manually updates the revision information of the virtual disk.

In a network boot system including a read cache mechanism, when a revision of a virtual disk is updated, a required condition on a client terminal side is that "when the revisions are different, booting must not be performed utilizing the read cache data as it is". In the event that there is a data mismatch even though the revision of data of the virtual disk and the revision of the read cache data are formally the same, for example, in a case in which the system administrator forgets to update the revision information when returning the setting to share mode after revising the data of the virtual disk in private mode, if the client terminal is booted utilizing the read cache data as it is, it will cause a major problem such as the OS not booting or stopping abnormally.

The direct cause of this problem occurring is that the client terminal uses read cache data from before the revision was revised. This entire problem can be solved by shifting the attitude in this regard to "when a change has been made to data of the virtual disk, the read cache is stopped unless special conditions are satisfied, irrespective of whether the revisions match or do not match."

To realize this attitude it is necessary that "a mark indicating that data of the virtual disk has been revised is provided inside the virtual disk". Hereunder, a specific method for providing a mark in a virtual disk is described in detail with reference to the drawings.

As the system configuration, a flag storage area of one bit is provided in a write cache partition (for example, partition V1 shown in FIG. 3) and a part of the virtual disk (for example, partition V2 shown in FIG. 3). FIG. 14 is referred to as an example of a disk access relationship diagram for this case. In particular, a flag that is held in a flag storage area of the virtual disk is defined as a "dirty flag". A dirty flag functions as means that conveys to all the clients that a change has been made to the data of the virtual disk. Each client terminal determines whether to start or stop the read cache based on the value of a dirty flag and not on the revision information at the time of boot-up.

(Rules relating to dirty flag): FIG. 6 is a chart that describes a list of rules relating to the dirty flag. The rules are described in detail hereunder.

Rule 1. The CPU of the client terminal checks whether "1" is written in the "dirty flag of the virtual disk" at the time of boot-up, and switches operations in the following manner according to the value of the dirty flag of the virtual disk.
 Rule 1-1 If the dirty flag is 0, the CPU starts the read cache. (normal operation)
 Rule 1-2 If the dirty flag is 1, the CPU stops the read cache.
Rule 2. When the client terminal is booted, always write "1" in the current flag storage area.
Rule 3. When the client terminal is booted in private mode, a successful revision of data of the virtual disk has been performed, and the revision information has been safely updated thereafter, write "0" in the dirty flag to clear the "dirty flag".

In rule 2, the "current flag storage area" is the write cache when the client terminal is booted in share mode, and is the virtual disk when the client terminal is booted in private mode. That is, since writing to the virtual disk is not performed no matter how many times the client terminal is booted in share mode, the value of the dirty flag is not changed. In contrast, when the client terminal is booted in private mode, the value of the dirty flag becomes 1 at the time the client terminal is booted, irrespective of the existence or non-existence of a change in the data of the virtual disk. Thus the "current flag storage area" varies relatively according to the operation mode.

Furthermore, if rule 3 is not implemented and the dirty flag has not been set to 0 for some reason, the dirty flag remains set to 1. In this case, since the read cache is stopped according to rule 1-2, revision operations can be continued if the operation mode is the private mode, and if the operation mode is the share mode a system failure due to an inconsistency with the cache data is avoided.

Figure 5A:
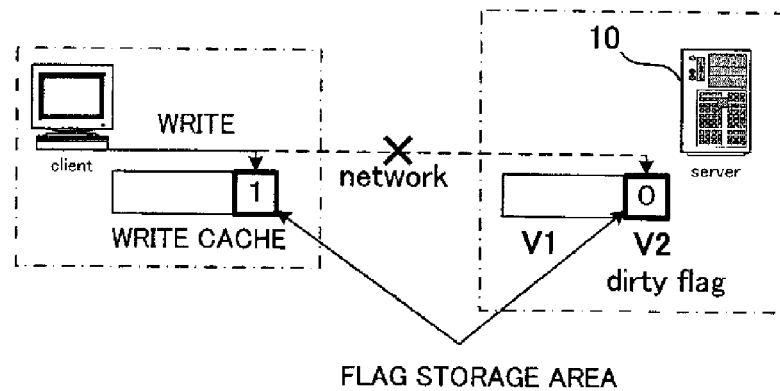
FIG. 5 is a diagram for explaining operation modes in a network boot system according to a second embodiment.
Figure 5B:
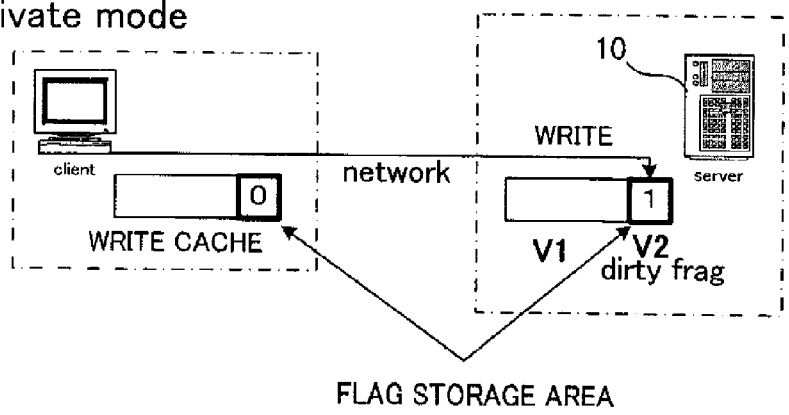

FIG. 5(A) illustrates operations of a client terminal when the client terminal has been booted in share mode. FIG. 5(B) illustrates operations of a client terminal when the client terminal has been booted in private mode.

If it is assumed that a client terminal is booted in share mode as illustrated in FIG. 5(A), the storage destination of write data of one bit that is written at the time of boot-up is a flag storage area provided in one part of a "write cache". Hence, writing is not performed to the dirty flag of the virtual disk. Accordingly, the value of the dirty flag does not change, and if the state before boot-up, that is, the flag state before boot-up, is 0, the state after boot-up will stay as 0.

When a client terminal is booted in private mode as illustrated in FIG. 5(B), the storage destination of write data of one bit that is written at the time of boot-up is the dirty flag on the virtual disk, and not the flag storage area provided in one part of a "write cache". Accordingly, the value of the dirty flag becomes 1, regardless of the state before boot-up.

More specifically, by checking the value of the dirty flag at the time of boot-up, the client terminal can determine whether or not the read cache data may be utilized. If the value of the dirty flag is 1, the client terminal can determine that, irrespective of the value of the revision, there is the possibility that a change has been made to the data of the virtual disk. In contrast, if the value of the dirty flag is 0, the client terminal can determine that, irrespective of the value of the revision, the version of data of the virtual disk and the version of the read cache data should be equivalent. Thus, operation of the read cache is determined based on the value of the dirty flag and not by comparing revisions. Because the value of the dirty flag is "one part of the virtual disk" that is shared by all clients, all the client terminals can know the value of the dirty flag at the time of boot-up. If the value of the dirty flag is 1, this indicates that a certain client terminal has made a change to the data of the virtual disk, and thus the client terminal in question stops the read cache (rule 1-2).

Figure 7:
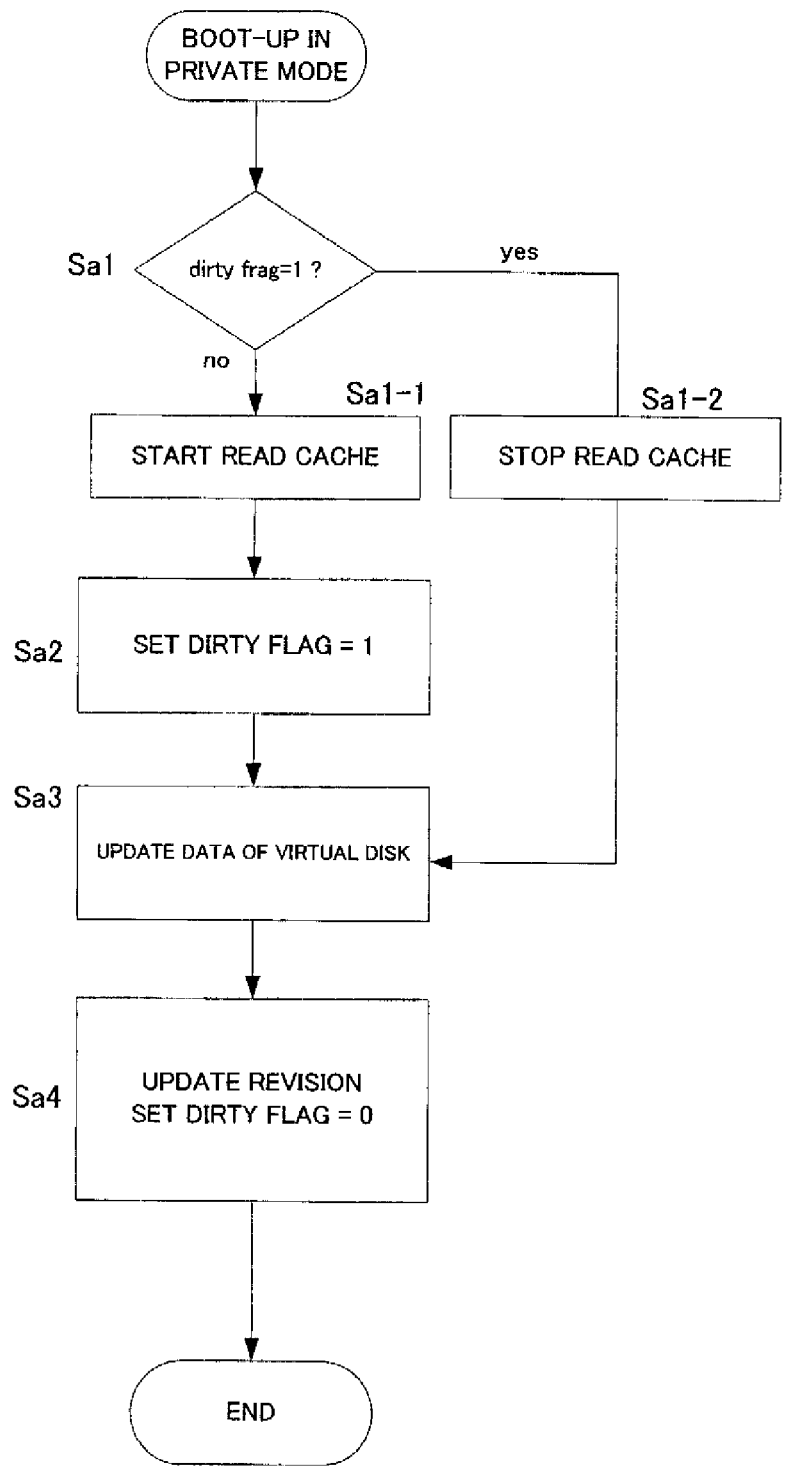
FIG. 7 is a diagram that explains the operation procedures of a read cache driver on a client terminal of the present invention.

FIG. 7 is a flowchart that describes procedures for revising data of the virtual disk. When revising data of the virtual disk, first, the server setting is set to "private mode" and the client terminal is booted (Start). The CPU of the client terminal checks the value of the dirty flag (Sa1).

If the dirty flag is 1, it indicates there is a possibility that the data of the virtual disk has already been revised or is being revised by another client terminal, and consequently the client terminal stops the read cache (rule 1-2). Therefore, for example, the following series of operations can be performed without a problem and thus server maintenance is facilitated:

1. The system administrator boots client terminal A in private mode, and after performing revision operations the system administrator stops client terminal A.

2. Further, without updating the revision information, the system administrator boots terminal B while still in private mode, performs a continuation of the revision operations, and then stops client terminal B.

3. Thereafter, the system administrator "updates the revision information" of the virtual disk and "clears the write flag".

However, at this time, although a problem will not arise if the read cache is operating at a "time of update operations by client terminal A that is booted as the first boot-up in private mode", the read cache must definitely be stopped at a "time of update operations at client terminal B that is booted as the second boot-up in private mode". For this reason, when booting a terminal, an operation of "setting an already-written state flag" must be performed each time. As the result of this operation, when a client terminal has been booted in private mode, as long as revision update operations are safely completed and the dirty flag is not cleared, the result will be as expected, namely, the dirty flag will be 1 when the terminal is next booted.

If the dirty flag is 0, since the data of the virtual disk has not been changed, 1 is written in the flag in order to notify other client terminals that revision operations will be performed from now (rule 2). Since the server is currently booted in private mode, 1 is written in the "dirty flag" provided in one part of the virtual disk (Sa2). Thereby, even if a client terminal is booted unexpectedly, the read cache will be stopped at the time of boot-up since the dirty flag is 1 (rule 1-2).

Next, the system administrator makes a change to the data of the virtual disk (Sa3). For example, the system administrator may update an OS, install, update, or delete an application, or change various settings. Note that because the virtual disk is shared by all the client terminals, a change that is made to the data affects the operations of all the clients. However, when read cache data exists, since the read cache data can not be utilized as it is, all of the read cache data is discarded (first embodiment) or only the read cache data corresponding to the sector(s) in which a change has been made is discarded (third embodiment). It is thereby possible to avoid the problem of a serious system failure caused by a data inconsistency.

After completing the data revision, the system administrator updates the revision information of the virtual disk, and finally sets the dirty flag to 0 (rule 3).

As described above, the invention according to the present embodiment is based on detailed study regarding what state is a "state in which a read cache should not operate". At first sight it seems that "a time when a client terminal is booted in private mode" is a condition. However, when examined in more detail it is found that such a state is "a case where after a client terminal has been booted as a first boot-up in private mode, a client terminal is booted as a second or subsequent boot-up in private mode". Therefore, an area of one bit as a "dirty flag" is secured in the virtual disk and operations are performed to set the flag without fail when booting each client terminal in private mode. As a result, a private terminal is booted in a state in which the value of the flag is 1 only "in a case where, after changing to the write enable mode, the terminal is booted as a second or subsequent boot-up". Thus, by including the decision "not to operate the read cache when the value of the dirty flag is 1", the read cache data can be safely utilized. Note that safer operations can be carried out by designing the system so that the operation regarding the "already-written state flag" is performed at the same time as "revision update operations".

Third Embodiment

Read Cache Data Revision Update: According to the third embodiment, operations are described for a case where, in share mode, a client terminal detects that the revision number of the virtual disk is larger than the revision number of the read cache data being held by the client terminal. In this case, as described in the second embodiment, the safest operation is to discard all of the past cache data and newly reconstruct read cache data.

However, according to this method, all of the accumulated read cache data is wasted each time a revision is updated, and this also increases the network load. On the other hand, when two sets of vDisk data that belong to different revisions are compared, the differences between the data decrease in accordance with the proximity of the revision numbers to each other. Hence, when revision numbers are close to each other, most of the data should be data that is being held without having being changed. Accordingly, in such case it is extremely inefficient to discard all of the read cache data, and it is preferable to avoid this situation as much as possible. Therefore, in order to utilize to the utmost cache data that has already been read, only data in sectors to which a change has been made as the result of updating a revision is discarded, the data of the changed sectors is read again from the virtual disk, and read cache data inside the sectors to which a change has not been made is held and not discarded.

According to the network boot system of the present invention a "changed area map" is created that shows the areas in a virtual disk whose data has changed between two different revisions, and the changed area map is applied to a "cache management table" relating to the revision before the revisal to thereby generate a post-revisal cache management table. As a result, the amount of data that is discarded is kept to the necessary minimum. A specific example is described hereunder with reference to FIG. 8.

FIG. 8(A) is a view that illustrates a changed area map for changes from revision 12 to revision 13. The existence or non-existence of changes is shown with respect to all of the sectors by recording 1 in an area (changed area) in which a change has been made to data inside the sector by updating the revision, and by recording 0 in an area (unchanged area) in which a change has not been made to data inside the sector by updating the revision. In the changed area map shown in FIG. 8(A), 1 is recorded in sector A and sector B, and 0 is recorded in all the other sectors. This indicates that a change was made to the data of sector A and sector B and that no changes were made to the data of the other sectors by changing from revision 12 to revision 13. More specifically, a changed area map 60 is revision history management information that records and associates information showing the areas in which data has been revised between revisions with respect to the data of the virtual disk. The changed area map 60 is represented with a bit string of information of one bit (0 or 1). For example, 0 is set as an initial state, and 1 is assigned to an area in which a change has been performed and 0 is assigned to an unchanged area.

The changed area map only shows the changed data areas (sectors), and does not hold any information regarding the contents of data in the areas. For this reason, the size of the capacity of the changed area map can be made much smaller than the size of the virtual disk (vDisk). For example, taking the example of a recording unit of a hard disk or the like that is currently used, if it is assumed that 512 bytes of data is stored in one sector, then one bit of capacity is required in the changed area map for every 512 bytes (=4096 bits) of the virtual disk. It is thus found that the capacity of the changed area map need only be 1/4096 (=1 bit/512 bytes) the capacity of the virtual disk.

FIG. 8(B) is a view that illustrates a cache management table 70a of revision 12. According to this example, it is shown that the data of sector A of the virtual disk is already stored in the local disk of the client terminal as read cache data and that there is no read cache data for the data of sector B of the virtual disk.

FIG. 8(C) shows a cache management table of revision 13 that is generated by applying the "changed area map" for changes from revision 12 to revision 13 shown in FIG. 8(A) to the "cache management table" of revision 12 shown in FIG. 8(B). As described above, the data in sector A on the virtual disk has already been read by the client terminal, and is already held as read cache data. However, according to the changed area map of FIG. 8(A), since the data in sector A has been revised, the read cache data of sector A that is being held in the local disk must be discarded. On the other hand, because there is originally no read cache data for sector B, the cache management flag is 0 and thus the data of sector B can be read over the network.

Thus, by utilizing a map that shows the areas that have changed between revisions, revisions can be updated safely while making maximum use of data that is read-cached on the client side, and thus the network load can be reduced.

Accordingly, it is found that no matter how old a revision is, as long as the cache management table of the current revision and all changed area maps for revisions up to the latest revision are available, by sequentially applying the changed area maps for changes between each revision, discarding of read cache data can be restricted to the data of the minimum number of sectors and the read cache data can be made to correspond to the latest revision.

Figure 9A:
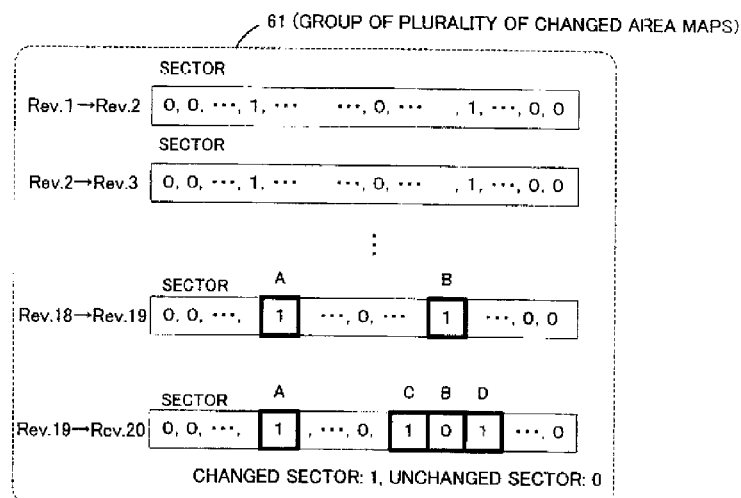
FIG. 9(A) shows a changed area map group 61.

FIG. 9(A) shows a changed area map group 61. This changed area map group includes all the changed area maps for changes between adjacent revisions, namely, from revision 1 to revision 2, from revision 2 to revision 3, and so on up to from revision 19 to revision 20 that is the latest revision.

Figure 9B:
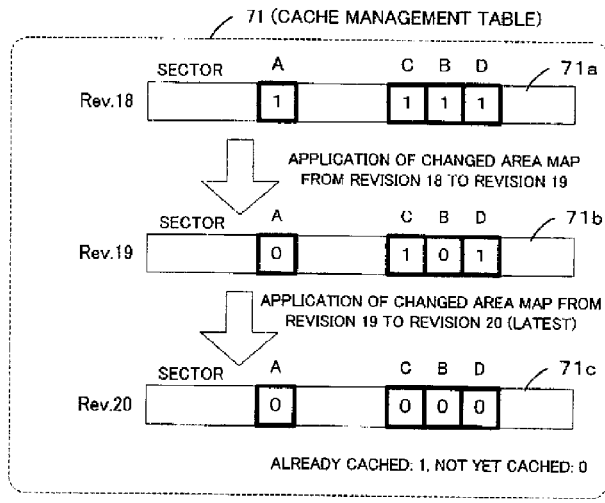
FIG. 9(B) shows the manner in which a cache management table that is managed by a read cache driver on a client terminal transitions sequentially from a cache management table of revision 18 to revision 20 that is the latest revision by sequentially applying the changed area map group 61 shown in FIG. 9(A)

FIG. 9(B) illustrates the manner in which the cache management table that is managed by the read cache driver on the client terminal transits sequentially from the cache management table of revision 18 to revision 20 that is the latest revision by sequentially applying the changed area map group 61 shown in FIG. 9(A).

More specifically, according to the example shown in FIG. 9, in a case where the revision (read cache data revision) of the cache management table that is managed by the read cache driver on the client terminal is revision 18, when a changed area map for changes from revision 18 to revision 19 and a changed area map for changes from revision 19 to revision 20 are sequentially applied to the cache management table of revision 18, values in the cache management table corresponding to sectors (changed areas) whose value in a changed area map is 1 are sequentially updated to 0, to thereby generate a cache management table of the latest revision 20.

Figure 10:
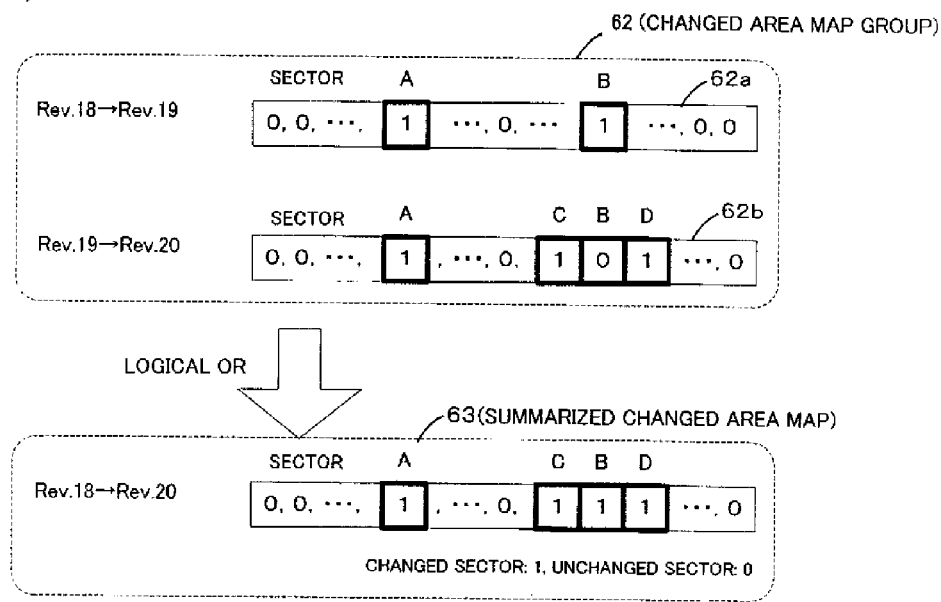
FIG. 10(A) shows an example of a changed area map group 62 that includes two changed area maps, and a single changed area map 63 that summarizes the two changed area maps.
FIG. 10(B) is a diagram that illustrates a transition in a cache management table 72 when the summarized changed area map 63 shown in FIG. 10(A) is applied to a cache management table of revision 18.
Figure 10:
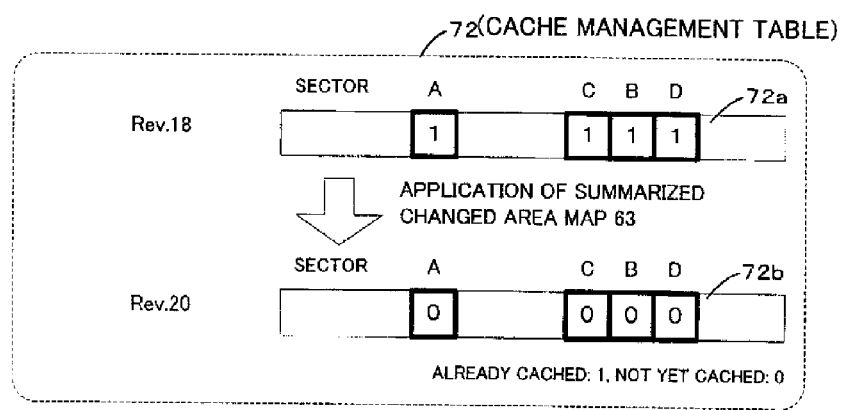

FIG. 10(A) illustrates an example of a changed area map group 62 comprising two changed area maps, and one changed area map 63 that summarizes the two changed area maps in the changed area map group 62. The changed area map group 62 includes a changed area map 62a for changes from revision 18 to revision 19, and a changed area map 62b for changes from revision 19 to revision 20. The changed area map 63 shown below the changed area map group 62 is a changed area map for changes from revision 18 to revision 20. The bit string of the changed area map 63 matches the logical OR of the changed area map 62a and the changed area map 62b. As is apparent from this example, it is found that all that is needed in order to create a single summarized changed area map is to determine the logical OR of a group of changed area maps relating to changes between a plurality of revisions that are summarized. Note that it is not possible to summarize changed area maps in the manner described above when using a method that directly records sectors of changed areas.

FIG. 10(B) shows a transition state of a cache management table 72 when the summarized changed area map 63 shown in FIG. 10(A) is applied to the cache management table of revision 18. When the summarized changed area map 63 is applied to a cache management table 72a of revision 18 that is managed by the read cache driver on the client terminal, it is found that a cache management table 72b that is the same as the cache management table of revision 20 shown in FIG. 9(B) is obtained.

Figure 11:
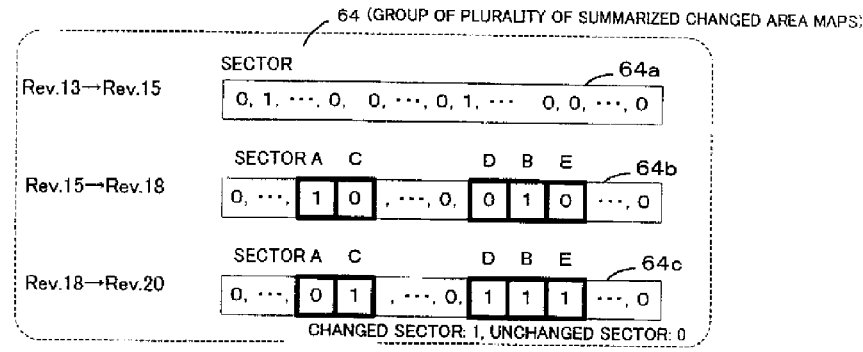
FIG. 11(A) shows an example of a group of a plurality of summarized changed area maps 64.
FIG. 11(B) shows an example of a transition state of a cache management table 73 when a client terminal that has a cache management table of revision 16 is caused to make a transition to revision 20 that is the latest revision.
FIG. 11(C) is a diagram that illustrates a transition of a cache management table when the cache management table of revision 12 is updated to the cache management table of revision 20.
Figure 11:
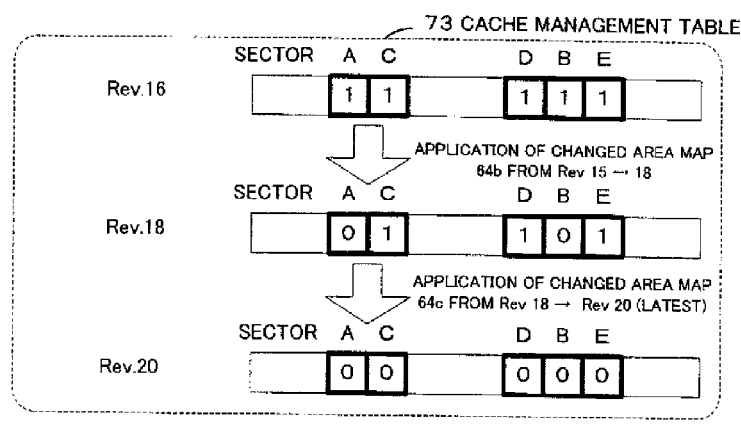
Figure 11:
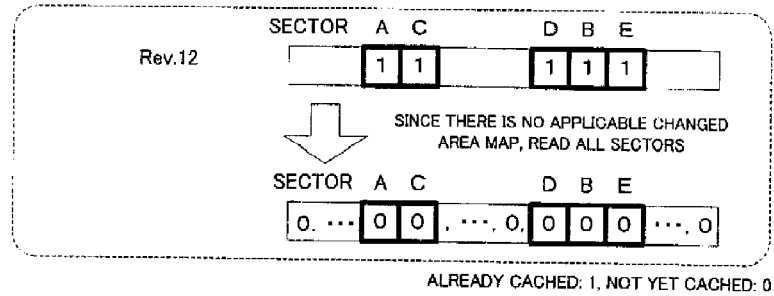

FIG. 11(A) illustrates a group of a plurality of summarized changed area maps 64. The changed area map group 64 shown in FIG. 11(A) includes a changed area map 64a for changes from revision 13 to revision 15, a changed area map 64b for changes from revision 15 to revision 18, and a changed area map 64c for changes from revision 18 to revision 20 (where it is assumed that revision 20 is the latest revision).

FIG. 11(B) illustrates an example of a transition state of a cache management table 73 when a client terminal that holds a cache management table of revision 16 is caused to make a transition to revision 20 that is the latest revision. When causing the client terminal to make a transition from revision 16 to revision 18, the changed area map 64b for changes from revision 15 to revision 18 shown in FIG. 11(A) can be applied. This is because revision 16 is included between revisions 15 and 18. Thereafter, the changed area map 64c from revision 18 to revision 20 may be further applied to the cache management table of revision 16. More specifically, a summarized changed area map can be applied to the cache management table of all revisions included in the summarized range.

FIG. 11(C) illustrates a transition of a cache management table when the cache management table of revision 12 is updated to the cache management table of revision 20. As illustrated in this example, with respect to the cache management table of an old revision (that is, in the example shown in FIG. 11(A), revision 12 and antecedent revisions) that is one for which the revision of the read cache data of the client terminal does not exist within any of the ranges of revisions included in the group of a plurality of summarized changed area maps, the cache management table of revision 12 can not be updated to the cache management table of revision 20.

In such a case, it is necessary for the read cache driver on the client terminal to discard all of the data of the read cache on the client terminal and newly read data again. In this way, it is thereby possible to cache the same data as the data cached according to the cache management table of revision 20 that is the latest revision.

Because the number of changed area maps increases together with an increase in the number of revisions, it is possible to consider that a case may arise in which a sufficient storage area cannot be secured. However, in such a case, the problem can be resolved by reducing the number of changed area maps by summarizing a plurality of changed area maps, or deleting changed area maps of old revisions that likely no longer remain. Even in the event that updating of a revision cannot be performed, as described with FIG. 11(C), the problem can be resolved by discarding all the data of the read cache on the client terminal and newly reading data again.

It is preferable to create a changed area map whenever data of the virtual disk is revised in private mode. This is preferable from the viewpoint of consistency of the data with the virtual disk and the convenience of updating data of the cache management table on a client terminal by accumulating and summarizing changed area maps. In this case, first a changed area map should be created, and next writing of data should be performed. It is also preferable to hold the changed area map in a location that can be accessed when the client boots up and that leaves a record at the time of a writing operation. Accordingly, it is rational to secure a storage area for holding the changed area map in the virtual disk. Holding a changed area map in the virtual disk has the advantage of enabling revision operations from any client terminal and the like.

Fourth Embodiment

Sharing Multiple Virtual Disks: According to the fourth embodiment, a case is described in which a plurality of virtual disks exist. When a configuration is adopted that allows a client terminal to select which virtual disk to use at the time of boot-up, updating of revisions is performed with respect to each virtual disk. Accordingly, in such a case, it is necessary to assign a title or identification mark or the like to each virtual disk to distinguish which virtual disk a revision is for.

In the case of a certain single virtual disk, it is needless to say that even when revisions of the virtual disk are updated and the data contents thereof change little by little, the virtual disk does not lose its identity as an OS. In this context, a group that has identity that includes a single virtual disk and revision history information based on a changed area map is defined as an "OS group".

A revision is update information of a virtual disk that belongs to the same OS group. As long as the OS group is the same, the capacity of the virtual disk is the same and the same cache area is used. It is preferable to store information relating to the OS group (name or identification mark or the like of the OS) together with a changed area map and the like in the virtual disk itself or in a location associated with the virtual disk. If a configuration is adopted in which the information is embedded in one part of the virtual disk or in which information can be acquired over a network, the OS group may be stored at any location on the network.

Accordingly, when a plurality of OS groups exist, that is, when there are a plurality of virtual disks, it is necessary to not only correlate the data of the virtual disks with the respective revisions of read cache data, but also to determine whether the OS group is the same.

Therefore, the read cache driver on the client terminal compares the OS group of the read cache data of the client terminal and the revision thereof with the OS group of the virtual disk and the revision thereof, and performs the following processing.
(1) When both the OS group and the revision match, the read cache driver utilizes the read cache data as it is.
(2) When the OS group is the same and the revision of the virtual disk is new, the read cache driver updates the read cache data, and utilizes the updated read cache data.
(3) When the OS group is the same and the revision of the virtual disk is old, the read cache driver does not utilize the read cache data.
(4) When the OS group is different, the read cache driver discards all of the read cache data and newly constructs the read cache or does not utilize the read cache.

Thus, a read cache driver manages revisions that belong to the same OS group. Accordingly, when a plurality of OS groups exist, it is necessary for the client terminal to also consider whether the OS group corresponds, determine whether the read cache data can be utilized, and only utilize the read cache data when it is determined that the read cache data can be utilized.

The OS group can be selected on the client terminal side at the time of boot-up. Thus, client terminals can be booted with different OSes or booted in different setting states. When read cache data can be utilized, network loads can be reduced and the boot-up speed is also improved.

A changed area map according to the present invention can reduce a network load that arises when updating cache data on a client terminal in a network boot system. As described above, the industrial applicability of implementation of the present invention is extremely high.

FIG. 1(B)
1 DATA
FIG. 2
40 CLIENT OS (APPLICATION)
46 FILTER DRIVER
48 NETWORK DRIVER
50 READ CACHE DRIVER
1 STATE
2 PHYSICAL MEMORY (NONPAGEABLE AREA)
3 CACHE MANAGEMENT TABLE
4 DISK DRIVER
FIG. 3(C)
1 *P2 AND P3 ARE INVISIBLE FROM OS
FIG. 5(A)
1 WRITE
2 WRITE CACHE
3 FLAG STORAGE AREA
FIG. 5(B)
1 WRITE
2 WRITE CACHE
3 FLAG STORAGE AREA
FIG. 6
1 CHECK VALUE OF DIRTY FLAG OF VIRTUAL DISK WHEN BOOTING CLIENT (Sa1)
2 WHEN DIRTY FLAG IS 0, START READ CACHE (Sa1-1)
3 WHEN DIRTY FLAG IS 1, STOP READ CACHE (Sa1-2)
4 WHEN BOOTING CLIENT TERMINAL, WRITE "1" IN FLAG STORAGE AREA (Sa2)
5 WHEN REVISION HAS BEEN SAFELY UPDATED, WRITE "0" IN DIRTY FLAG (Sa4)
FIG. 7
Sa1-1 START READ CACHE
Sa1-2 STOP READ CACHE
Sa2 SET DIRTY FLAG=1
Sa3 UPDATE DATA OF VIRTUAL DISK
Sa4 UPDATE REVISION
   SET DIRTY FLAG=0
1 BOOT-UP IN PRIVATE MODE
2 END
FIG. 8(A)
1 CHANGED AREA MAP 60 FROM REVISION 12→REVISION 13
2 SECTOR
3 BIT STRING
4 SECTOR A AND SECTOR B ARE CHANGED AREAS
5 CHANGED AREA: 1, UNCHANGED AREA: 0

FIG. 8(B)
1 CACHE MANAGEMENT TABLE 70a OF REVISION 12
2 SECTOR
3 BIT STRING
4 ALREADY CACHED (CACHE MANAGEMENT FLAG IS 1)
5 NOT YET CACHED (CACHE MANAGEMENT FLAG IS 0)
FIG. 8(C)
1 CACHE MANAGEMENT TABLE 70b OF REVISION 13
2 SECTOR
3 BIT STRING
4 APPLICATION OF CHANGED AREA MAP FROM REVISION 12 TO REVISION 13
5 NOT YET CACHED (CACHE MANAGEMENT FLAG IS 0)
FIG. 9(A)
1 61 (GROUP OF PLURALITY OF CHANGED AREA MAPS)
2 SECTOR
3 CHANGED SECTOR: 1, UNCHANGED SECTOR: 0
FIG. 9(B)
1 71 (CACHE MANAGEMENT TABLE)
2 SECTOR
3 APPLICATION OF CHANGED AREA MAP FROM REVISION 18 TO REVISION 19
4 APPLICATION OF CHANGED AREA MAP FROM REVISION 19 TO REVISION 20 (LATEST)
5 ALREADY CACHED: 1, NOT YET CACHED: 0
FIG. 10(A)
1 62 (CHANGED AREA MAP GROUP)
2 SECTOR
3 LOGICAL OR
4 63 (SUMMARIZED CHANGED AREA MAP)
5 CHANGED SECTOR: 1, UNCHANGED SECTOR: 0
FIG. 10(B)
1 72 (CACHE MANAGEMENT TABLE)
2 SECTOR
3 APPLICATION OF SUMMARIZED CHANGED AREA MAP 63
4 ALREADY CACHED: 1, NOT YET CACHED: 0
FIG. 11(A)
1 64 (GROUP OF PLURALITY OF SUMMARIZED CHANGED AREA MAPS)
2 SECTOR
3 CHANGED SECTOR: 1, UNCHANGED SECTOR: 0
FIG. 11(B)
1 73 CACHE MANAGEMENT TABLE
2 SECTOR
3 APPLICATION OF CHANGED AREA MAP 64b FROM Rev 15→18
4 APPLICATION OF CHANGED AREA MAP 64c FROM Rev 18→Rev 20 (LATEST)
FIG. 11(C)
1 SECTOR
2 SINCE THERE IS NO APPLICABLE CHANGED AREA MAP, READ ALL SECTORS
3 ALREADY CACHED: 1, NOT YET CACHED: 0
FIG. 12(A)
101 OS (APPLICATION)
102 DISK DRIVER
FIG. 12(B)
104 CLIENT OS (APPLICATION)
106 FILTER DRIVER
107 NETWORK DRIVER

FIG. 13(A)
1 CACHE MANAGEMENT TABLE
2 TYPE OF STATE FLAG
3 VALUE OF STATE FLAG
4 READ MANAGEMENT FLAG
5 NOT READ YET
6 ALREADY READ
7 WRITE MANAGEMENT FLAG
8 NOT WRITTEN YET
9 ALREADY WRITTEN
FIG. 13(B)
1 PROCESSING OF READ REQUEST SIGNAL
2 STATE
3 OPERATION
4 CACHE DATA UNAVAILABLE (NO DATA)
5 CACHE DATA AVAILABLE
6 CACHE DATA UNAVAILABLE (DATA HAS BEEN UPDATED)
7 CACHE DATA UNAVAILABLE (WRITING HAS BEEN ALREADY PERFORMED)
FIG. 14
40 CLIENT OS (APPLICATION)
46 FILTER DRIVER
48 NETWORK DRIVER
50 READ CACHE DRIVER
1 STATE
2 PHYSICAL MEMORY (NONPAGEABLE AREA)
3 CACHE MANAGEMENT TABLE
4 DISK DRIVER
FIG. 15
1 DATA

What is claimed is:

1. A network boot system wherein
a network boot server which provides a disk image including an operating system operating on a client terminal as a virtual disk and a client terminal including a physical storage device are connected to each other over a network,
the client terminal includes a physical memory which can temporarily store data necessary during boot-up of the operating system and a network interface for accessing the server over the network,
the operating system includes
a filter driver for converting access to a local bus of the client terminal into access to the network, and a read cache driver for driving the storage device, and
the read cache driver includes a read cache mechanism that read-caches data read out from the network boot server by the filter driver on the storage device;
wherein the read cache mechanism includes a read cache area for holding data received from the server and a cache management area for writing back at least a part of a management flag for determining by the read cache driver whether the data read out from the server is in an already-written state that is held in the physical memory;
wherein the read cache driver in configured to receive a write request signal to the read cache area, whereby the physical memory is configured in response to store an indicator that the write request signal has been received, and whereby the read cache driver is configured to not use the read cached data of the read cache area;
the network boot system comprising, a micro-processor, a first computer storage location that stores a revision of data of the virtual disk, a second computer storage location that stores a revision of the read cached data of the read cache area, where-in the micro-processor compares the first and second revisions at a time of a client terminal boot-up or at a time when the client terminal side mounts the boot image as a virtual disk over the network, and the micro-processor determines an operation of the read cache driver based on the comparison result.

2. The network boot system according to claim 1, wherein the revision of data of the virtual disk is held as a part of the virtual disk or in association with the virtual disk.

3. The network boot system according to claim 1, wherein the revision of the read cached data of the read cache area is held in a part of the storage device.

4. The network boot system according to claim 1, further comprising:
   a write cache area for caching write information from the client terminal, and
   a flag storage area of at least one bit in a part of the virtual disk.

5. The network boot system according to claim 1, wherein the system is configured such that:
   when the client terminal is booted in a private mode in which a client can directly write to a virtual disk on a server, 1 is written in a flag storage area provided in a storage area of the virtual disk; and
   the client terminal starts or stops the read cache mechanism based on a value stored in the flag storage area provided in the storage area of the virtual disk at a time of boot-up or at a time when the client terminal side mounts the boot image as a virtual disk over the network.

6. The network boot system according to claim 1 which generates a changed area map that shows areas in which data has been changed in the virtual disk between two different revisions among the revisions of data of the virtual disk, and generates a post-revisal cache management table by applying the changed area map to a cache management table that represents a state of read cache data in a pre-revisal revision.

7. The network boot system according to claim 6, wherein the changed area map is stored in a part of the virtual disk or in an area that the client terminal can read at a time of boot-up or at a time when the client terminal side mounts the boot image as a virtual disk over the network and which is writable to from the client terminal.

8. The network boot system according to claim 6, further comprising a summarized map of consecutive changed area maps by determining a logical OR of changed area maps between consecutive revisions among the revisions of data of the virtual disk.

9. The network boot system according to claim 6, wherein the system is configured such that when the client terminal receives a write request signal after the client terminal is booted in a private mode in which a client can directly write to a virtual disk, first information showing the areas in which data has been revised with respect to the data of the virtual disk is recorded in the changed area map, followed by writing of data to the virtual disk.

10. The network boot system according to claim 7, wherein the system is configured such that when the client terminal receives a write request signal after the client terminal is booted in a private mode in which a client can directly write to a virtual disk, first information showing the areas in which data has been revised with respect to the data of the virtual disk is recorded in the changed area map, followed by writing of data to the virtual disk.

* * * * *